(12) United States Patent
Haga et al.

(10) Patent No.: US 8,167,718 B2
(45) Date of Patent: May 1, 2012

(54) STORAGE MEDIUM STORING GAME PROGRAM, GAME APPARATUS, AND GAME CONTROL METHOD

(75) Inventors: Takayuki Haga, Kyoto (JP); Tsutomu Koganezawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1187 days.

(21) Appl. No.: 11/984,848

(22) Filed: Nov. 21, 2007

(65) Prior Publication Data

US 2008/0188302 A1 Aug. 7, 2008

(30) Foreign Application Priority Data

Feb. 7, 2007 (JP) ................................ 2007-027575

(51) Int. Cl.
*A63F 9/24* (2006.01)
(52) U.S. Cl. ............... 463/33; 463/30; 463/42; 463/43; 345/427; 345/428; 345/630
(58) Field of Classification Search .................... 463/30, 463/33, 42, 43; 345/427, 428, 630
See application file for complete search history.

(56) References Cited

U.S. PATENT DOCUMENTS

| 6,353,437 | B1 * | 3/2002 | Gagne ........................... 345/473 |
| 6,504,539 | B1 * | 1/2003 | Hiraki ........................... 345/427 |
| 2005/0176502 | A1 * | 8/2005 | Nishimura et al. ............. 463/31 |
| 2005/0192096 | A1 * | 9/2005 | Maehiro ........................ 463/37 |
| 2007/0213975 | A1 * | 9/2007 | Shimoda et al. ................. 704/9 |
| 2008/0119280 | A1 * | 5/2008 | Ikeda et al. ..................... 463/42 |

FOREIGN PATENT DOCUMENTS

JP 11-128533 5/1999

* cited by examiner

*Primary Examiner* — Pierre Eddy Elisca
*Assistant Examiner* — Shahid Kamal
(74) *Attorney, Agent, or Firm* — Nixon & Vanderhye P.C.

(57) ABSTRACT

A game apparatus includes an LCD, and displayed on the LCD is a game screen including a display portion that displays a planar positional relationship between a player object and enemy objects present in a three-dimensional game space. The player object and enemy objects are flight objects, for example. Each time a player presses an X button, a selection state of an enemy object as a target of the player object is switched by turns according to priorities of the enemy objects. When the player continuously presses the X button over a certain period of time, regardless of the priorities of the enemy objects, the selection state is switched to that of a highest priority enemy object.

8 Claims, 19 Drawing Sheets

FIG. 3
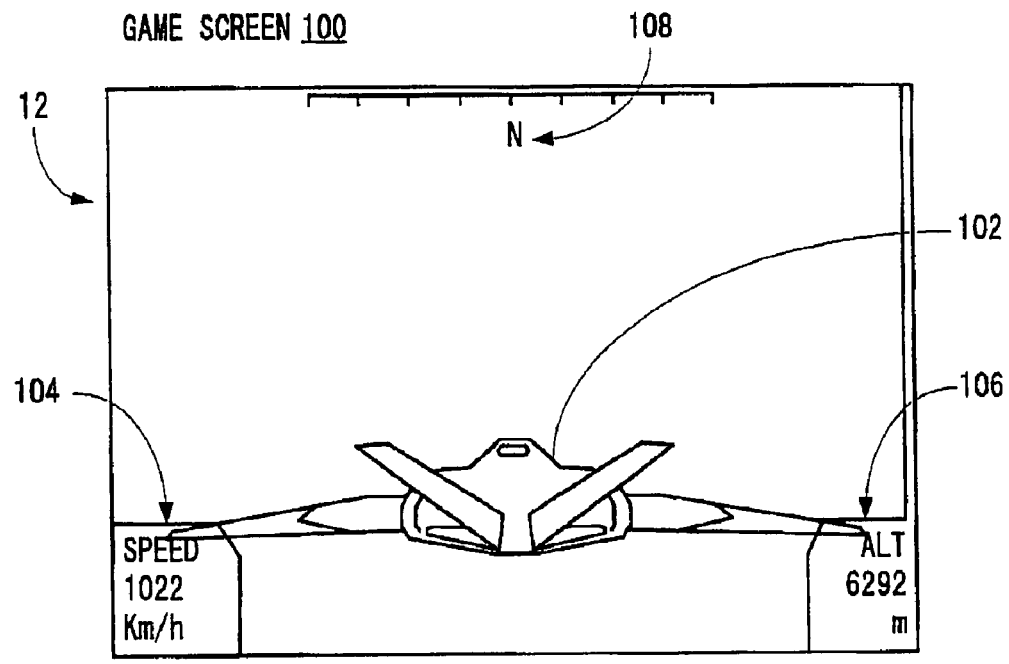
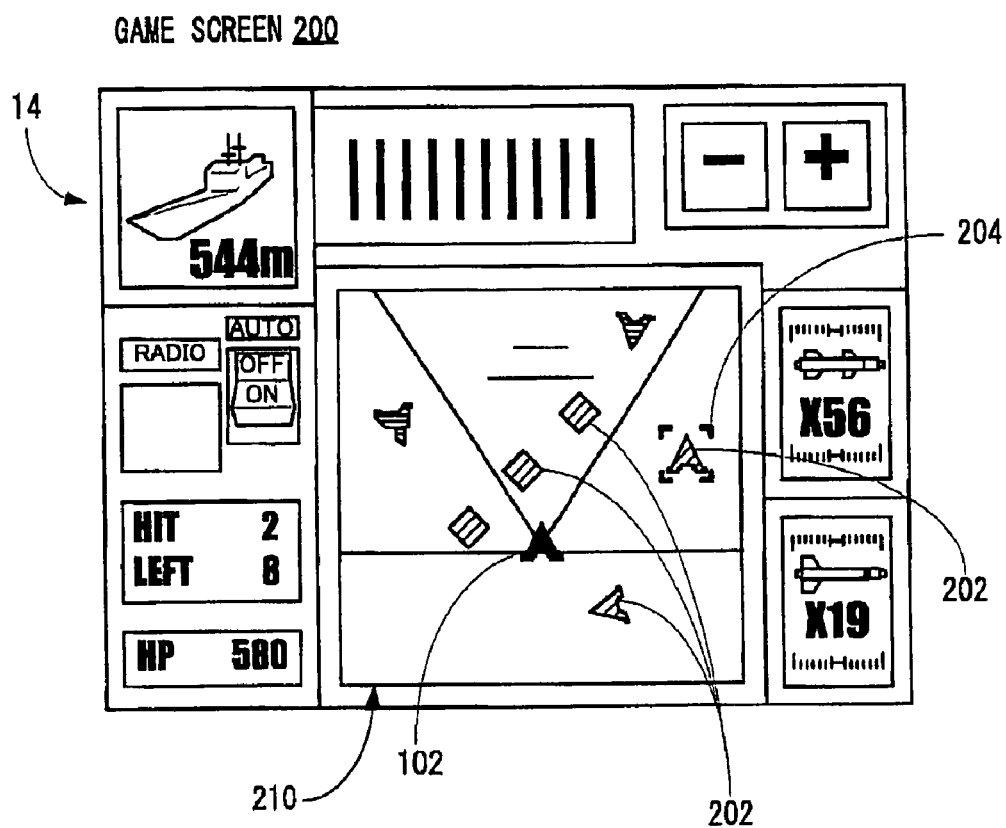

FIG. 7
(A) PARTIAL ENLARGED VIEW OF DETERMINATION AREAS
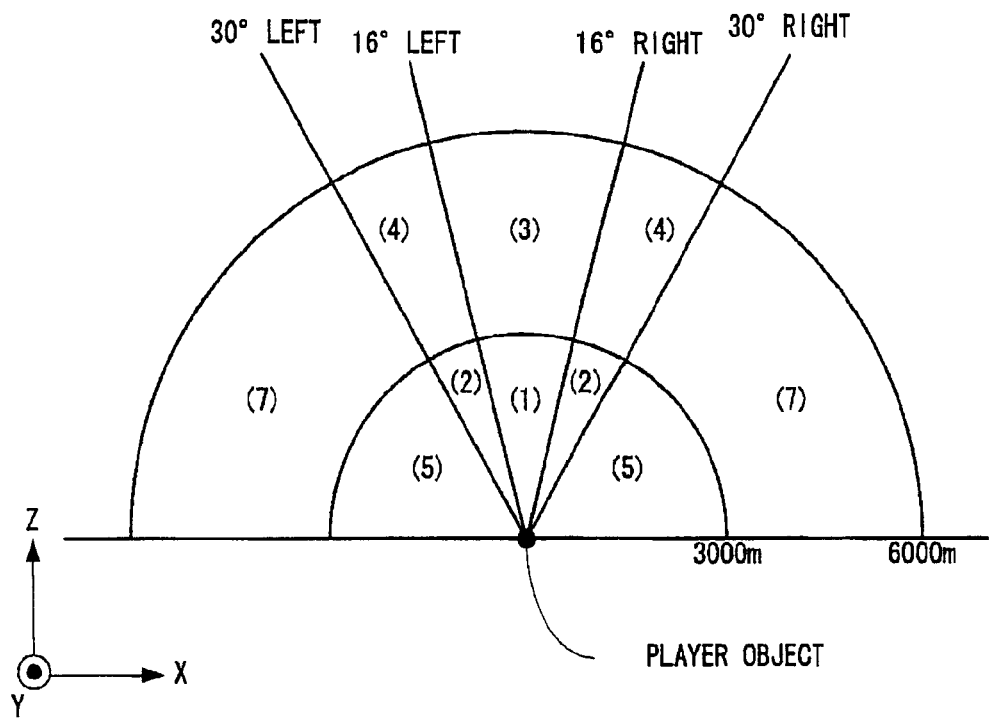
(B) RANGE OF VIEW IN VERTICAL DIRECTION
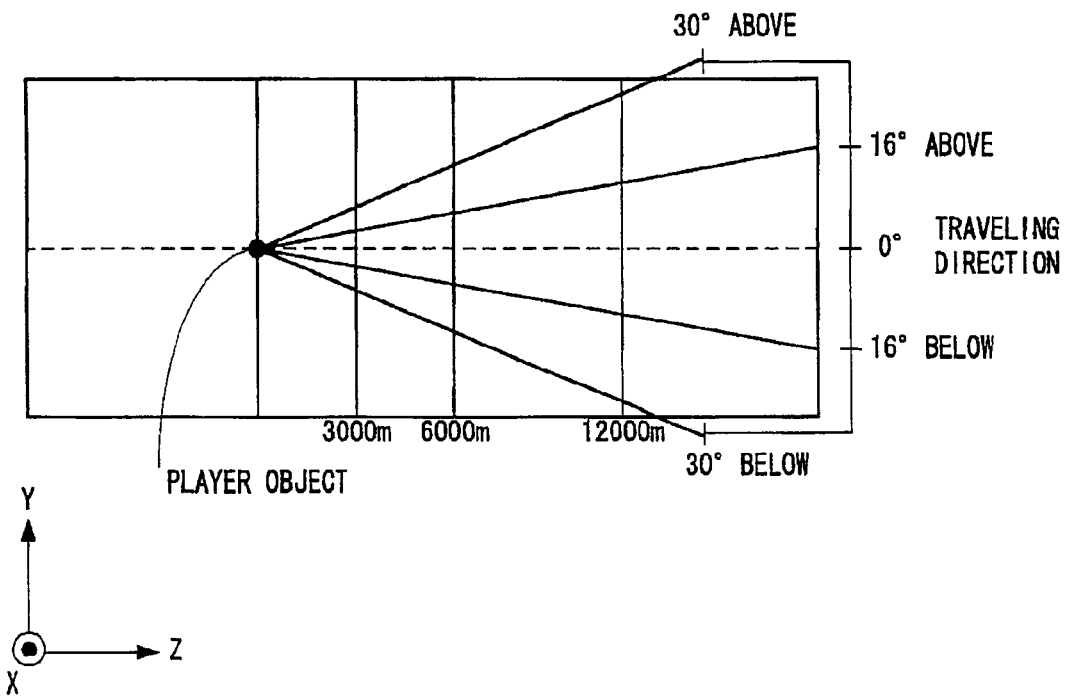

STORAGE MEDIUM STORING GAME PROGRAM, GAME APPARATUS, AND GAME CONTROL METHOD

CROSS REFERENCE OF RELATED APPLICATION

The disclosure of Japanese Patent Application No. 2007-27575 is incorporated herein by reference.

TECHNICAL FIELD

The illustrative embodiments relate to a storage medium storing a game program, a game apparatus, and a game control method. More particularly, certain exemplary embodiments relate to a storage medium storing a game program, a game apparatus, and a game control method, for playing a shooting game, for example.

BACKGROUND AND SUMMARY

Conventionally, as a shooting game or the like, there is known one in which a plurality of targets moving in a game space are sequentially switched and a target to be an attack object is selected therefrom, according to a player's operation.

An example of related art is disclosed in a Japanese Patent Laying-open No. 11-128533 [A63F 9/22, G06T 17/40] laid-open on May 18, 1999. In this related art, priorities are set for a plurality of non-player objects (targets) present within the view of a player object such that the shorter the distance from the player object the higher the priority. Then, by a first operation on a Z button of a controller a first priority non-player object is selected as a focused non-player object and by a second operation a next (second) priority non-player object is selected as a focused non-player object.

The manual for PS2 game software "Ace Combat Zero: The Belkan War" discloses on pp. 8-9 that by pressing the Δ button of a controller switching of an object is performed.

In such related art games, since a player sequentially switches targets and selects a target, a desire may arise, in the course of selecting a desired target, to select a previously selected target. In such a case, after all targets have been selected, a target is reselected from the start. Alternatively, when a game is left for a certain period of time without any player operation, a list of priorities is obtained again, and a first priority (first) target is selected again. As such, since the player needs to sequentially select all targets or leave a game for a certain period of time to reselect a desired target, it can be said that game operability is poor.

Therefore, it is a feature of certain illustrative embodiments to provide a storage medium storing a novel game program, a novel game apparatus, and a novel game control method.

It is another feature of certain exemplary embodiments to provide a storage medium storing a game program, a game apparatus, and a game control method that are capable of improving operability for selecting a target.

To solve the above-described problems, certain exemplary embodiments adopt the following configurations. It is to be understood that reference numerals, supplemental remarks, and the like, in parentheses show the corresponding relationship with certain exemplary embodiments, as will be described later, to assist in the understanding of certain exemplary embodiments, and thus are not limiting to the exemplary embodiments in any way.

An exemplary embodiment is directed to a storage medium storing a game program for a game apparatus that displays on a screen a virtual game space in which a plurality of non-player objects serving as targets are arranged, the game program causing a computer of the game apparatus to perform a selection step, a non-player object selection priority setting step, and an input state continuous time detection step. In the selection step, the plurality of non-player objects are sequentially switched and one non-player object is selected therefrom each time a predetermined input is made from an operation means. In the non-player object selection priority setting step, priorities for selection to be made in the selection step are set for the plurality of non-player objects. Then, in the input state continuous time detection step, a continuous time during which a state where the predetermined input is being made continues is detected. The selection step includes: a first selection step of sequentially switching the plurality of non-player objects and selecting a non-player object, according to the priorities set in the non-player object selection priority setting step, when the continuous time is less than a predetermined value; and a second selection step of switching to a non-player object with a highest one of the priorities and selecting the non-player object, when the continuous time is equal to or greater than the predetermined value.

In an exemplary embodiment, a game apparatus (10) displays on a screen (100, 200) a virtual game space in which a plurality of non-player objects (202) serving as targets are arranged. The game program causes a computer of the game apparatus to perform a selection step (34, S117, S127, S129, S201, S203), a non-player object selection priority setting step (34, S115, S133), and an input state continuous time detection step (34, S87, S93, S95). In the selection step, each time a predetermined input is made from an operation means (22), the plurality of non-player objects are sequentially switched and one non-player object is selected therefrom. In the non-player object selection priority setting step, priorities for selection to be made in the selection step are set for the plurality of non-player objects. In the input state continuous time detection step, a continuous time during which a state where the predetermined input is being made continues is detected. For example, a period of time during which a certain button is continuously pressed is detected. The selection step includes a first selection step and a second selection step. In the first selection step, when the continuous time is less than a predetermined value, the plurality of non-player objects are sequentially switched and a non-player object is selected, according to the priorities set in the non-player object selection priority setting step. In the second selection step, when the continuous time is equal to or greater than the predetermined value, switching to a non-player object with the highest one of the priorities is performed and the non-player object is selected. Namely, in the second selection step, without following the priorities, a highest priority non-player object is selected.

According to the exemplary embodiment, depending on the continuous time of a predetermined input, non-player objects are sequentially switched according to priorities or switching to a highest priority non-player object is performed without following the priorities, and thus, operability for switching targets can be improved. Therefore, for example, even in the course of sequentially selecting non-player objects, by continuing a predetermined input over a predetermined value, a highest priority non-player object can be selected and thus a desired object can be easily reselected.

Further illustrative features of the exemplary embodiment may also include the non-player object selection priority setting step, when the continuous time is equal to or greater than the predetermined value, priorities for selection to be made in the selection step may be re-set for the plurality of non-player objects, and in the second selection step, switching to a non-player object with a highest one of the re-set priorities may be performed and the non-player object may be selected.

In another illustrative feature of the exemplary embodiment and in the non-player object selection priority setting step, when the continuous time is equal to or greater than the predetermined value, priorities for selection to be made in the selection step are re-set for the plurality of non-player objects. For example, when a player continuously presses a predetermined button over a certain period of time, priorities for selection to be made in the selection step are updated. Therefore, in the second selection step, switching to a non-player object with the highest one of the re-set (updated) priorities is performed and the non-player object is selected.

According to a further illustrative feature of the exemplary embodiment, when a predetermined input continues over a predetermined value, selection priorities are re-set and thus a target based on the latest information can be reselected.

The exemplary embodiment may also include a game program to cause the computer to perform an elapsed time detection step of detecting an elapsed time from when switching and selection are performed in the selection step, in the non-player object selection priority setting step, when the elapsed time is equal to or greater than a predetermined value, priorities for selection to be made in the selection step may be re-set for the plurality of non-player objects, and in the first selection step, each time the predetermined input is made, the plurality of non-player objects may be sequentially switched and a non-player object may be selected, according to the priorities re-set in the non-player object selection priority setting step.

The exemplary embodiment may include an illustrative feature of an elapsed time detection step (34, S7, S125), an elapsed time from when switching and selection are performed in the selection step is detected. In the non-player object selection priority setting step, when the elapsed time is equal to or greater than a predetermined value, priorities for selection to be made in the selection step are re-set for the plurality of non-player objects. In the first selection step, each time the predetermined input is made, the plurality of non-player objects are sequentially switched and a non-player object is selected, according to the priorities re-set in the non-player object selection priority setting step.

The exemplary embodiment may include an illustrative feature of switching and selecting a non-player object can be performed based on the latest information updated each time a predetermined time has elapsed.

An illustrative feature of the exemplary embodiment may include the game program which may further cause the computer to perform: a player object information obtaining step of obtaining location information on and a traveling direction of a player object in the virtual game space; an area division step of dividing the virtual game space into a plurality of areas based on the location information and traveling direction and left and right angles and a distance with the location information being a base point; and an area selection priority setting step of setting selection priorities for the areas divided in the area division step, and in the non-player object selection priority setting step, higher priorities are sequentially set to the non-player objects in order from one present in an area with a highest one of the priorities set in the area selection priority setting step to one in a lowest priority area.

The exemplary embodiment may include a player object information obtaining step (34, S31) where location information on and a traveling direction of a player object (102) in the virtual game space are obtained. In an area division step (34, S33), the virtual game space is divided into a plurality of areas based on the location information on and traveling direction of the player object and left and right angles and a distance with the location information being a base point. For example, the virtual game space is divided into a plurality of areas according to a distance from the player object and a shift from the traveling direction of the player object. In an area selection priority setting step, selection priorities are set for the areas divided in the area division step. Therefore, for example, in the non-player object selection priority setting step, higher priorities are sequentially set to the non-player objects in order from one present in an area with a highest one of the priorities set in the area selection priority setting step to one in a lowest priority area.

According an illustrative feature of the exemplary embodiment, since priorities of non-player objects are set according to areas into which a virtual game space is divided based on a positional relationship between a player object and the non-player objects, the priorities of the non-player objects can be set by a simple process based on the positional relationship between the player object and the non-player objects.

An additional illustrative feature of the exemplary embodiment may further cause the computer to perform a prediction step of predicting location information and a traveling direction where the player object reaches in time T (T>0), and in the area division step, the virtual game space may be divided into a plurality of areas based on the location information and traveling direction predicted in the prediction step and left and right angles and a distance with the location information being a base point.

In the exemplary embodiment location information and a traveling direction where the player object reaches in time T (T>0) are predicted. For example, if the current movement speed of the player object can be found, based on the movement speed and a traveling direction, the location and movement direction in time T can be easily calculated by physical calculation. In the area division step, the virtual game space is divided into a plurality of areas based on the location information and traveling direction predicted in the prediction step and left and right angles and a distance with the location information being a base point.

According to an illustrative feature of the exemplary embodiment, priorities of non-player objects can be set based on the predicted location and movement direction of a player object.

Another exemplary embodiment may include a game apparatus that displays on a screen a virtual game space in which a plurality of non-player objects serving as targets are arranged, the game apparatus comprising: a selection means, a non-player object selection priority setting means, and an input state continuous time detection means. The selection means sequentially switches the plurality of non-player objects and selects one non-player object therefrom each time a predetermined input is made from an operation means. The non-player object selection priority setting means sets priorities for selection to be made by the selection means, for the plurality of non-player objects. The input state continuous time detection means detects a continuous time during which a state where the predetermined input is being made continues. Then, the selection means includes: a first selection means for sequentially switching the plurality of non-player objects and selecting a non-player object, according to the priorities set by the non-player object selection priority setting means, when the continuous time is less than a predetermined value; and a second selection means for switching to a non-player object with a highest one of the priorities and selecting the non-player object, when the continuous time is equal to or greater than the predetermined value.

In a further exemplary embodiment a game control method for a game apparatus that displays on a screen a virtual game space in which a plurality of non-player objects serving as targets are arranged, the game control method comprising: (a) sequentially switching the plurality of non-player objects and selecting one non-player object therefrom each time a predetermined input is made from an operation means; (b) setting priorities for selection to be made in the step (a), for the plurality of non-player objects; and (c) detecting a continuous time during which a state where the predetermined input is being made continues. The step (a) includes the steps of: (a-1) sequentially switching the plurality of non-player objects and selecting a non-player object, according to the priorities set in the step (b), when the continuous time is less than a predetermined value; and (a-2) switching to a non-player object with a highest one of the priorities and selecting the non-player object, when the continuous time is equal to or greater than the predetermined value.

In certain exemplary embodiments the operability for switching and selecting a target may be improved.

The above described and other features, aspects and advantages of certain exemplary embodiments will become more apparent from the following detailed description of certain exemplary embodiments when taken in conjunction with the accompanying drawings.

BRIEF DESCRIPTION OF THE DRAWINGS

FIG. 3 is an illustrative view showing examples of game screens to be displayed on first and second LCDs of the game apparatus shown in FIG. 1;

FIG. 7 shows a partial enlarged view of the determination areas shown in FIG. 6 and an illustrative view of the three-dimensional game space as viewed from a lateral direction;

DETAILED DESCRIPTION

Figure 1:
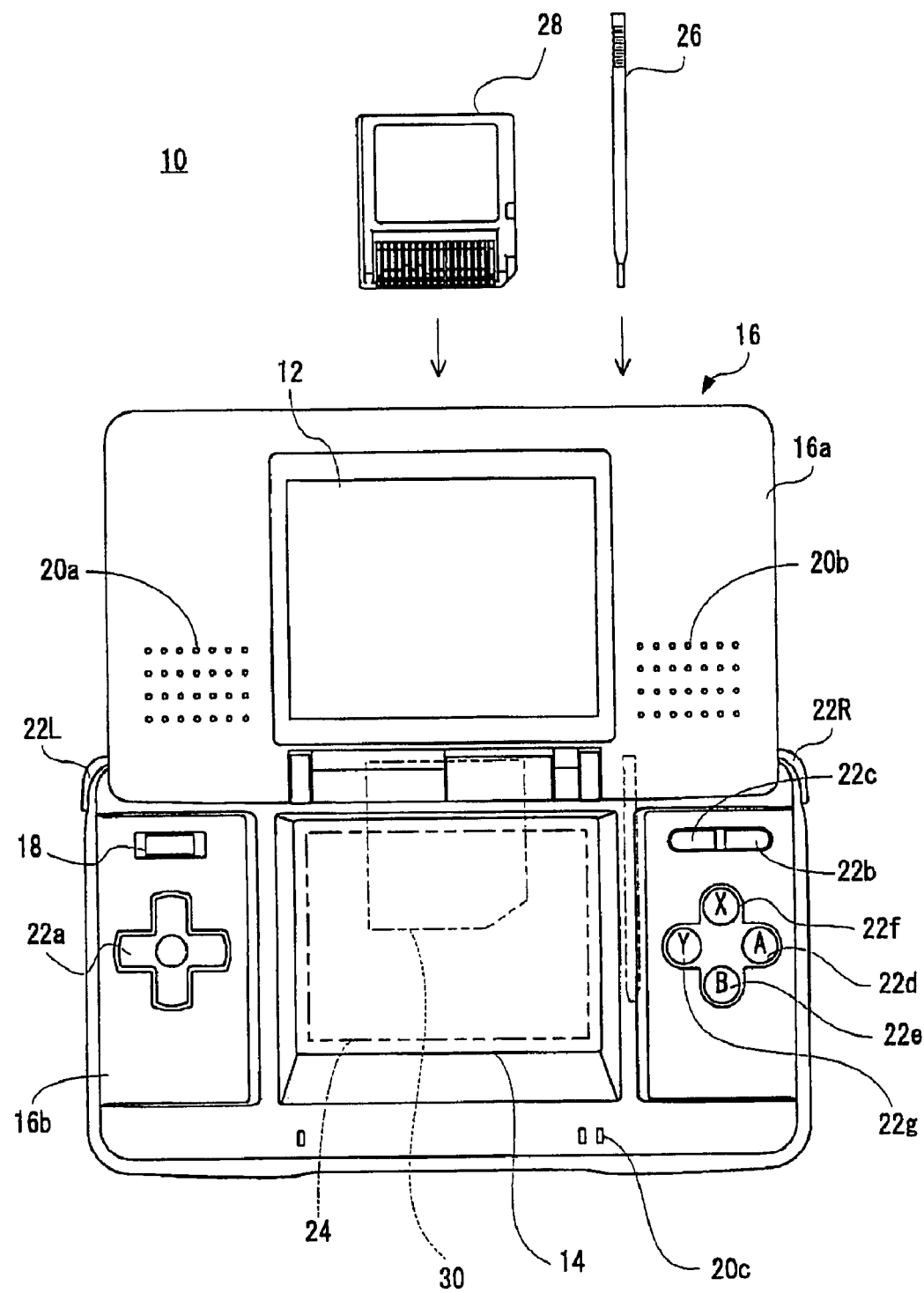
FIG. 1 is an illustrative view showing one exemplary embodiment of a game apparatus.

Referring to FIG. 1, a game apparatus 10 of an illustrative embodiment is integrated with a music playing control program to thereby function as a music playing apparatus. The game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, other devices may be used in place of the LCD; examples include, but are not limited to, an EL (Electronic Luminescence) display or a plasma display.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. A power switch 18 is provided at the left of the LCD 14 of the lower housing 16b.

Furthermore, on the upper housing 16a, sound releasing holes 20a and 20b for speakers 36a and 36b (FIG. 2) are formed by sandwiching the LCD 12 from side to side. Then, on the lower housing 16b, a microphone hole 20c for a microphone (not illustrated) is formed, and operating switches 22 (22a, 22b, 22c, 22d, 22e, 22L and 22R) are provided.

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16*b*. Other switches 22*b*-22*g* are arranged at the right of the LCD 14 on the one surface of the lower housing 16*b*. In addition, the switch 22L and the switch 22R are arranged at the right and left corners sandwiching the connected portion with the upper housing 16*a* on the upper side surface of the lower housing 16*b*.

The direction instructing switch 22*a* functions as a digital joystick, and is utilized for instructing a moving direction of a player object (or player character) to be operated by a user or a player and instructing a moving direction of a cursor, and so forth by operating any one of four depression portions. Also, a specific role can be assigned to each of the four depression portions, and by operating any one of the four depression portions, it is possible to instruct (designate) the assigned role.

The start switch 22*b* is formed by a push button, and is utilized for starting, restarting, temporarily stopping, or pausing a game, etc. The select switch 22*c* is formed by the push button, and utilized for a game mode selection, etc.

The action switch 22*d*, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22*e*, that is, the B button is formed by the push button, and is utilized for changing a game mode selected by the select switch 22*c*, canceling an action determined by the A button 22*d*, and so forth.

The action switch 22*f*, that is, the X button and the action switch 22*g*, that is, the Y button are formed by the push button, and are utilized for a subsidiary operation when the game cannot be advanced only with the A button 22*d* and the B button 22*e*. It should be noted that the X button 22*f* and the Y button 22*g* can be used for the similar operation to the A button 22*d* and B button 22*e*. Of course, the X button 22*f* and the Y button 22*g* are not necessarily utilized in the game play.

The action switch (left depression button) 22L and the action switch (right depression button) 22R are formed by the push button, and the left depression button (L button) 22L and the right depression button (R button) 22R can perform the same operation as the A button 22*d* and the B button 22*e*, and also function as a subsidiary of the A button 22*d* and the B button 22*e*. In addition, the L button 22L and the R button 22R can change the roles assigned to the direction switch 22*a*, the A button 22*d*, the B button 22*e*, the X button 22*f*, and the Y button 22*g* to other roles.

Also, on a top surface of the LCD 14, a touch panel 24 is provided. As the touch panel 24, any kind of a resistance film system can be utilized; examples include, but are not limited to, an optical system (infrared rays system) or an electrostatic capacitive coupling system. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects a coordinates of an operated position of the stick 26, etc. (that is, touched) to output coordinates data corresponding to the detected coordinates.

It should be noted that in this exemplary embodiment, a resolution of the display surface of the LCD 14 (the same is true for the LCD 12) is 256 dots×192 dots, and a detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including an operating object such as a line, a figure (including an icon) for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point (operate) an image such as a player character, an enemy character, an item character, an operating object, etc. to be displayed on the LCD 14 and select commands by operating the touch panel 24 with the use of the stick 26, etc. Also, it is possible to change the direction of a virtual camera (viewpoint) provided in the three-dimensional game space, and instruct (input) a scrolling (gradual moving display) direction of the game screen (map).

It should be noted that depending on the kind of the game, other input instructions can be made with the use of the touch panel 24. For example, it is possible to input a coordinates input instruction, and input text, numbers, symbols, etc. by hand on the LCD 14.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

In addition, in this embodiment, the stick 26 can be housed in the housing portion (shown by dotted lines in FIG. 1) provided on the lower housing 16*b*, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a rear surface or a lower edge (bottom surface) of the lower housing 16*b*. Although omitted in FIG. 1, a connector 32 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

It should be noted that although not illustrated in FIG. 1, the speakers 36*a* and 36*b* (see FIG. 2) are provided at a position corresponding to sound release holes 20*a* and 20*b* inside the upper housing 16*a*.

Furthermore although omitted in FIG. 1, for example, a battery accommodating box is provided on a rear surface of the lower housing 16*b*, and a volume switch, an external expansion connector, an earphone jack, etc. are provided on a bottom surface of the lower housing 16*b*.

Figure 2:
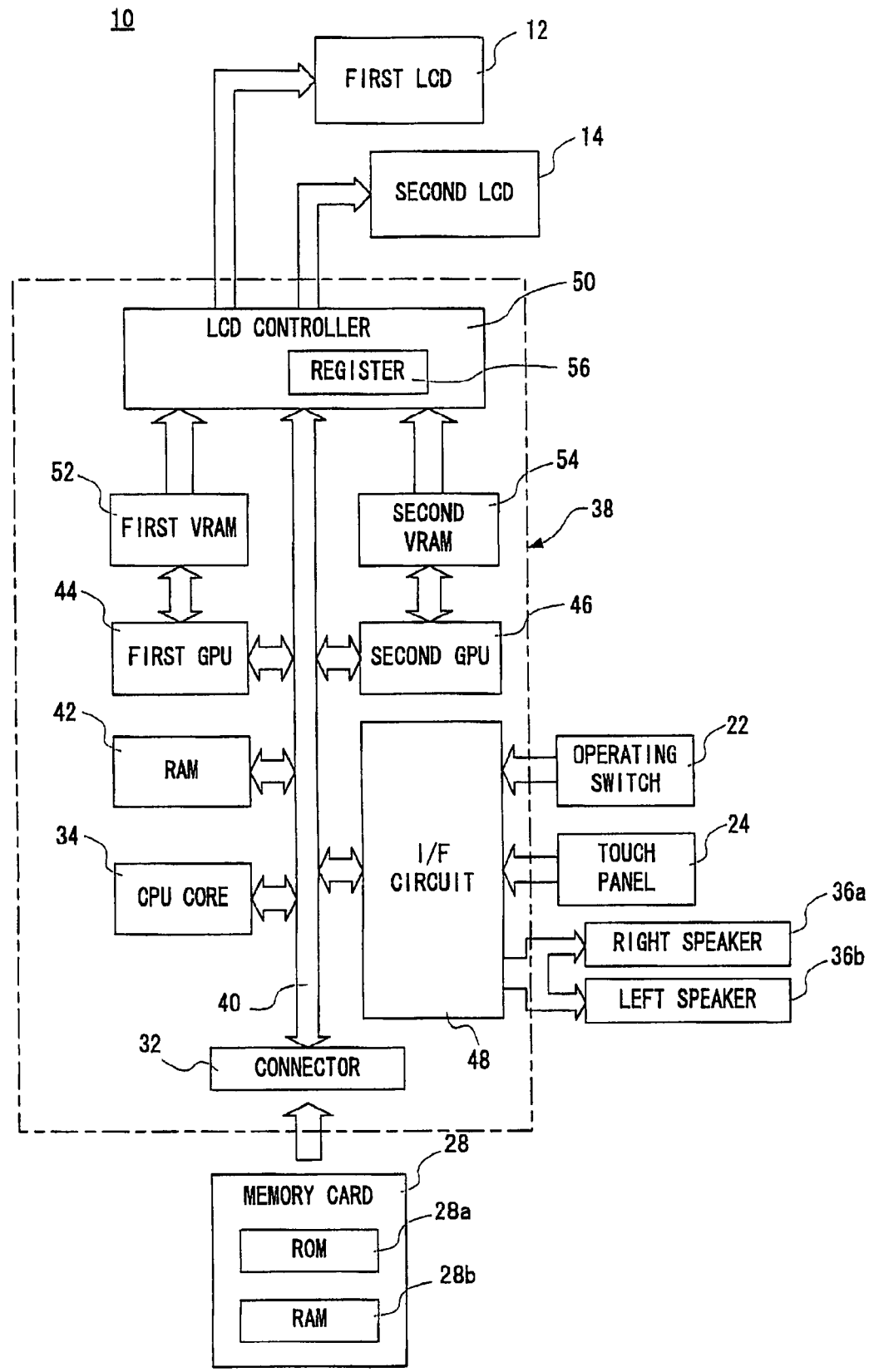
FIG. 2 is a block diagram showing an electrical configuration of the game apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, a circuit component such as a CPU core 34, etc. is mounted. The CPU core 34 is connected to the above-described connector 32 via a bus 40, and is connected with a RAM 42, a first graphics processing unit (GPU) 44, a second GPU 46, an input-output interface circuit (hereinafter, referred to as "I/F circuit") 48, and an LCD controller 50.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game (music playing game) to be executed by the game apparatus 10, image data (text and character image, background image, item image, icon (button) image, message image, etc.), data of the sound (music) necessary for the game (sound data), etc. The RAM (backup RAM) 28b stores (saves) data of the game, result data of the game, etc.

The RAM 42 is utilized as a buffer memory or a working memory. That is, the CPU core 34 loads the program, the image data, the sound data, etc. stored in the ROM 28a of the memory card 28 into the RAM 42, and executes the loaded game program. The CPU core 34 executes a game process while storing data (game data, flag data, etc.) generated or obtained in correspondence with a progress of the game in the RAM 42.

It should be noted that the game program, the image data, the sound data, etc. are stored (loaded) from the ROM 28a entirely at a time, or partially and sequentially so as to be stored into the RAM 42.

However, a program as to an application except for the game and image data required to execute the application may be stored in the ROM 28a of the memory card 28. In addition, sound (music) data may be stored therein as necessary. In such a case, in the game apparatus 10, the application is executed.

Each of the GPU 44 and the GPU 46 forms a part of a rendering means, is constructed by, for example, a single chip ASIC, and receives a graphics command from the CPU core 34 to generate image data according to the graphics command. It should be noted that the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: character data, texture data, etc.) necessary for executing the graphics command.

It should be noted that the CPU core 34 writes image data necessary for rendering to the first VRAM 52 and the second VRAM 54 via the GPU 44 and the GPU 46. The GPU 44 accesses the VRAM 52 to create image data for rendering, and the GPU 46 accesses the VRAM 54 to create image data for rendering.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data created by the GPU 44 to the LCD 12, and outputs the image data created by the GPU 46 to the LCD 14 in a case that the data value of the register 56 is "0". On the other hand, the LCD controller 50 outputs the image data created by the GPU 44 to the LCD 14, and may additionally output the image data created by the GPU 46 to the LCD 12 in a case that the data value of the register 56 is "1".

It should be noted that the LCD controller 50 can directly read the image data from the VRAM 52 and the VRAM 54, or read the image data from the VRAM 52 and the VRAM 54 via the GPU 44 and the GPU 46.

The I/F circuit 48 is connected with the operating switch 22, the touch panel 24 and the speakers 36a and 36b. Here, the operating switch 22 is the above-described switches 22a, 22b, 22c, 22d, 22e, 22L and 22R, and in response to an operation of the operating switch 22, a corresponding operation signal (operation data) is input to the CPU core 34 via the I/F circuit 48. Furthermore, the coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a and 36b via the I/F circuit 48.

FIG. 3 shows an example of a game screen 100 displayed on the LCD 12 and an example of a game screen 200 displayed on the LCD 14, when a virtual game, such as a combat flight simulation game, of the present embodiment is played using the game apparatus 10 shown in FIGS. 1 and 2. The game screen 100 includes a player object 102 and the player object 102 is a flight object that mimics a fighter's body. Although, not shown for simplicity, enemy objects of the present embodiment are principally flight objects such as fighters, the enemy objects also include other objects (for simplicity, hereinafter, referred to as "ground objects") present on the ground or water (in water), such as tanks, armored vehicles, battleships, or submarines.

On the game screen 100, the fighter's speed and altitude of the player object 102 are visually displayed. In the present embodiment, a display portion 104 for the fighter's speed is provided at the lower left corner of the game screen 100 and a display portion 106 for the fighter's altitude is provided at the lower right corner of the game screen 100. Furthermore, a character 108 ("N" in FIG. 3) of an orientation (N, E, W, or S) indicating the traveling direction of the fighter is displayed on the upper center of the game screen 100. Note that, although not shown, enemy objects, geographic objects, and the like, may also be displayed on the game screen 100.

Figure 4:
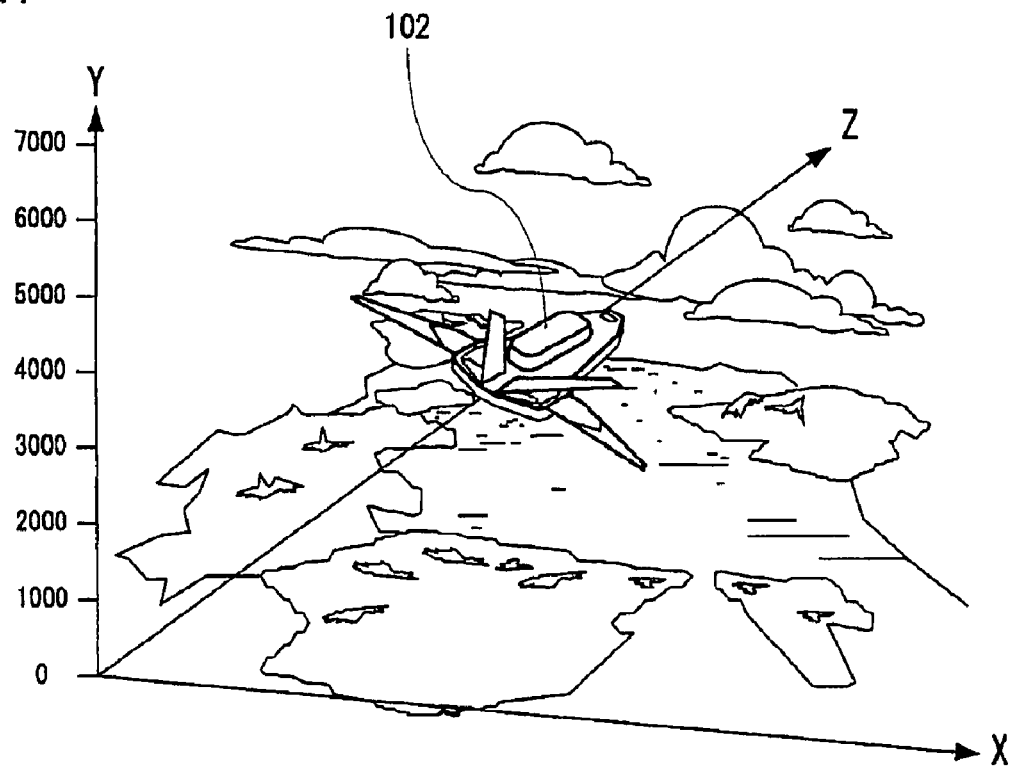
FIG. 4 is an illustrative view showing a player object in a three-dimensional game space.

The game screen 200 includes a display portion (radar display portion) 210 for showing a planar (in an XZ plane) positional relationship between the player object 102 and enemy objects 202 when all or part of a three-dimensional (virtual) game space is looked down on from above (see FIG. 4). For example, in the radar display portion 210, the player object 102 is represented as a triangular graphic object (shaded solidly) at the center and the enemy objects 202 are represented as other triangular or rectangular graphic objects (patterned with lines). In addition, a cursor 204 is displayed that points to an enemy object 202 (which hereinafter may be referred to as a "target object") to be an object (target) of the player object 102.

On the game screen 200, other information may be provided such as information on the player object 102 (life (HP) and the type and number of missiles carried by the player object 102, and the like). Additionally, information such as the number of enemy objects 202 (the number of enemy objects 202 hit (HIT) and the number of enemy objects 202 left (LEFT)) may also be displayed around the radar display portion 210.

Here, as shown in FIG. 4, in a three-dimensional game space of the present exemplary embodiment, a lateral direction in a horizontal plane is an X-axis direction, a depth direction in the horizontal plane is a Z-axis direction, and a direction (height direction) vertical to the horizontal plane is a Y-axis direction. Though a detailed description is not provided, calibration defining the scale of sea level (altitude) ranging from 0 m to 7000 m is provided to the Y axis. Hence, an altitude corresponding to the location in the Y-axis direction of the player object 102 is displayed on the above-described display portion 106 of the game screen 100.

Figure 5:
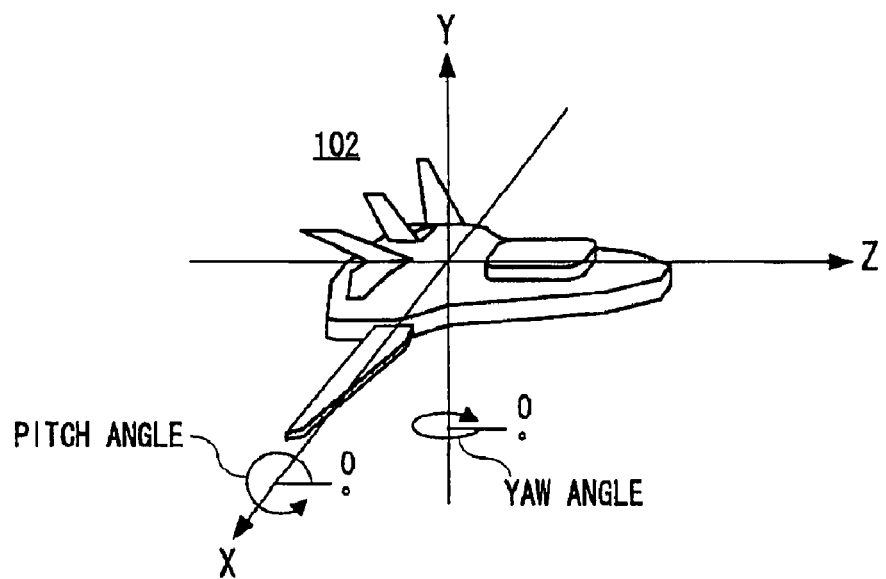
FIG. 5 is an illustrative view for describing a yaw angle and a pitch angle of the player object.

By controlling the yaw angle and pitch angle of the player object 102 by a player's operation (e.g., an operation on the cross switch 22a), the traveling direction of the player object 102 can be changed. As shown in FIG. 5, in the present exemplary embodiment, when the player object 102 moves in the Z-axis direction in the three-dimensional game space, the yaw angle may be an angle around the Y axis in the three-dimensional game space (world coordinates) and the pitch angle may be an angle around the X axis in the three-dimensional game space. It is also possible to control the fighter's speed (not shown) by a player's operation (e.g., on/off of the A button 22d or B button 22e). Accordingly, in the three-dimensional game space, the player object 102 can move or fly freely.

In such a virtual game, the player selects a desired target object and controls the movement of the player object 102 to follow the selected target object. Then, the player allows the player object 102 to launch a missile in a state, such as a lock-on state, in which the player object 102 can attack the target object, and at the right timing. Note that the lock-on state refers to a state in which the player object 102 aims at an enemy object 202 (target object) and is able to track the enemy object 202.

When the missile launched from the player object 102 hits the target object, the target object explodes and disappears from the three-dimensional game space. On the other hand, when the missile launched from the player object 102 does not hit the target object, the target object runs away or attacks the player object 102.

Normally, in such a virtual game, each time the X button 22f is turned on (operated), target objects are switched by turns according to priorities. Specifically, a state (selection state) in which an enemy object 202 is selected as a target object is switched to another according to priorities. Though not shown, at this time, display of the game screen 200 shown in FIG. 3 is updated such that the cursor 204 points to a target object (enemy object 202) selected according to the priorities.

As used herein, the term "priorities" refers to the order of switching the selection state of a target object. In the present embodiment, each time the X button 22f is turned on, priorities are sequentially switched, in order, from first to fourth. When the X button 22f is turned on with a fourth priority target object being selected, a first priority target object is selected. That is, the selection state returns to that of the first (first priority) target object.

In the present exemplary embodiment, priorities are determined according to the priorities of areas ("determination areas", as will be described later) determined with the location of the player object 102 being the center. Note, however, that for enemy objects 202 in the same priority area the enemy object 202 closer in distance (or angle) to the player object 102 may have a higher priority. Here, the distance between the player object 102 and an enemy object 202 is calculated according to equation 1. Note that the coordinates of the current location of the player object 102 are (X1, Y1, Z1) and the coordinates of the current location of an enemy object 202 are (X2, Y2, Z2).

$$\text{Distance} = \sqrt{\{(X1-X2)^2+(Y1-Y2)^2+(Z1-Z2)^2\}} \quad [\text{Equation 1}]$$

Furthermore, when the respective distances between a plurality of enemy objects 202 within a priority area and the player object 102 are the same, the enemy object 202 having a smaller shift from the traveling direction of the player object 102 may have a higher priority. A shift may be an angle θ in the horizontal direction along the XZ plane and an angle α in the vertical direction along the YZ plane.

For simplicity, the magnitude (absolute value) of an angle between a vector, such as a movement vector, of the traveling direction of the player object 102 and a vector having a start point at the location of the player object 102 and an end point at the location of an enemy object 202 may be calculated as a shift from the traveling direction of the player object 102.

Figure 6:
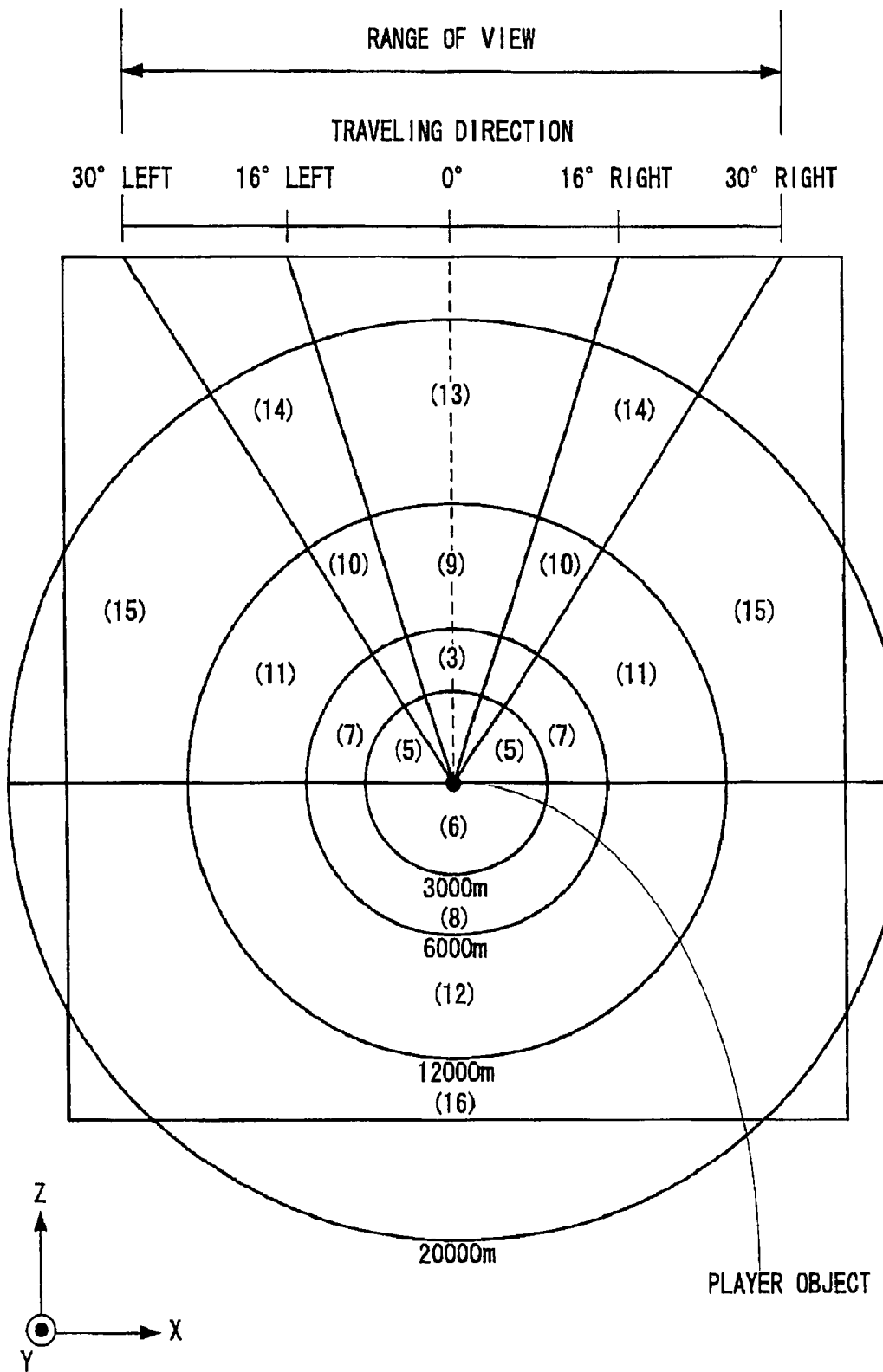
FIG. 6 is an illustrative view showing determination areas for setting priorities of enemy objects.

For example, as shown in FIG. 6 and FIG. 7(A) which is a partial enlarged view of FIG. 6, determination areas are set using four concentric circles on the horizontal plane with the player object 102 being the center, a straight line indicating the range of view of the player object 102 and straight lines by which the range of view is divided at predetermined angles, and a rectangular frame that defines, by a certain size, a range (horizontal plane) in the horizontal direction of a three-dimensional game space. In the present exemplary embodiment, the radii of the four concentric circles are 3000 m, 6000 m, 12000 m, and 20000 m, respectively, on a scale in the three-dimensional game space. The range of view of the player object 102 is 30° to the left and right with the traveling direction of the player object 102 being 0°. The range of view is divided at 16° on the left and right with the traveling direction of the player object 102 being 0°, whereby superiority or inferiority is assigned to the magnitudes of a shift from the traveling direction of the player object 102. Though not shown, a rectangle that defines the horizontal plane in the three-dimensional space may be 15000 m×14000 m in size, for example.

As can also be seen from FIGS. 6 and 7(A), in the present exemplary embodiment, determination areas are 16 divided areas (closed areas) and the areas are assigned with numbers. The numbers are identification information which identify an area and the magnitudes of the numeric values of the numbers indicate priorities (priority levels) of an area. Priorities of enemy objects 202 are determined according to the priorities of areas. Note that the player object 102 is traveling in an upward direction in FIGS. 6 and 7(A).

In the present exemplary embodiment, when determination areas are determined, area numbers are fixedly determined. A method of determining area numbers follows three conditions. The first condition is that an area ahead (in the traveling direction) of the player object 102 has higher priority than an area behind the player object 102. The second condition is that an area closer in direction to the player object 102 has a higher priority. The third condition is that an area having a smaller angle in the horizontal direction with respect to the traveling direction of the player object 102 has a higher priority.

In the present exemplary embodiment, by placing importance on a difficulty level for tracking or attacking an enemy object 202 by the player object 102, determination areas are set or area numbers are determined according to conditions such as those described above. Note, however, that a method of setting determination areas and how to determine area numbers does not need to be limited to the methods of the present embodiment and can be arbitrarily set by a game programmer or developer.

Note also that in the present embodiment area numbers (priorities) of determination areas are fixedly determined but may be arbitrarily determined depending on the type or difficulty level of a game or the type of enemy objects 202 appearing in a three-dimensional game space.

FIG. 7(B) is a diagram of the three-dimensional game space as viewed from the lateral direction (X-axis direction) and shows the range of view in an up-down direction of the player object 102. In the present embodiment, with the traveling direction being 0°, the range of 30° above and below is the range of view of the player object 102. As can be seen from FIG. 7(B), when the location in the horizontal direction of a ground object is close to the player object 102, the ground object becomes a blind spot for the player object 102. Therefore, when priorities are determined, for ground objects, angles in the up-down direction may not be considered.

Note that, in the present embodiment, for simplicity, only an angle is detected for the up-down direction; however, as with the horizontal direction, the range of view may be divided into a plurality of areas for the up down direction and priorities may be determined according to priorities of the areas.

If, for example, during the selection of a target object, the player wants to reselect again a target object (enemy object 202) selected first or an enemy object 202 already selected, the X button 22f needs to be repeatedly operated. Such an operation is very cumbersome; particularly when there are a large number of enemy objects 202. Operability may become poor, which may cause a decrease in interest in the game itself.

In view of this, in the present exemplary embodiment, a highest priority enemy object 202 is selected by a simple operation to improve operability.

Specifically, when the X button 22f is continuously pressed over a certain period of time, such as 60 frames in the present exemplary embodiment, regardless of the priority of the current target object, the highest priority enemy object 202 is selected as a target object. Therefore, when reselecting an enemy object 202 selected first or an enemy object 202 already selected, reselection can be performed by a simple operation.

Figure 8:
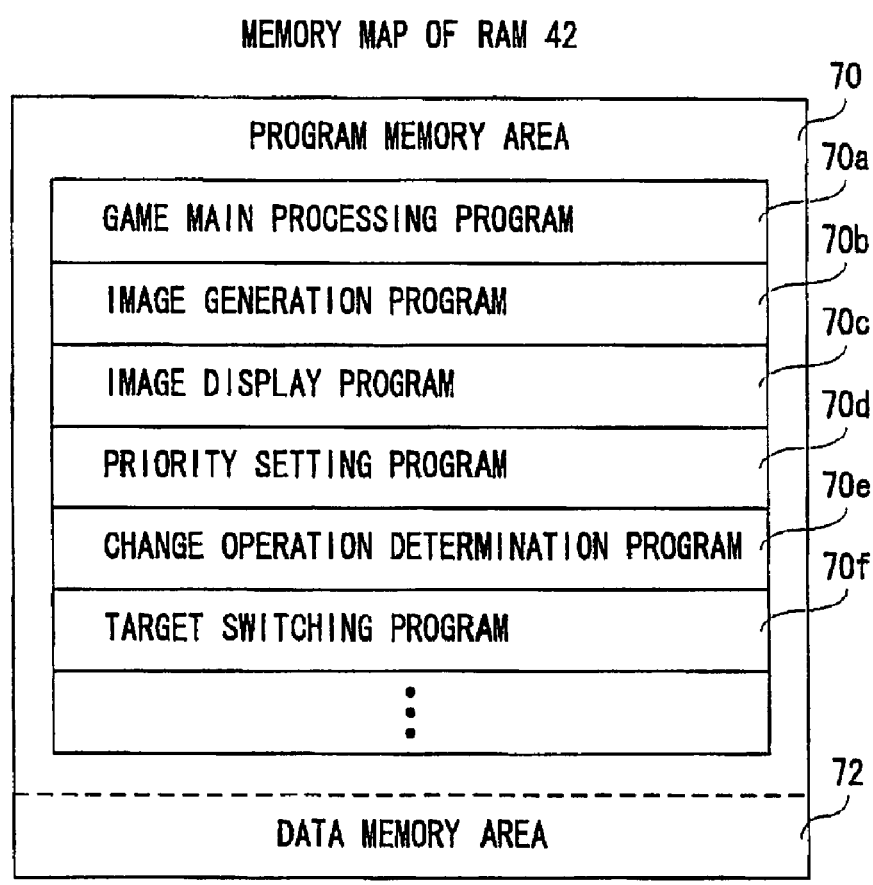
FIG. 8 is an illustrative view showing an example of a memory map of a RAM shown in FIG. 2.

FIG. 8 is an illustrative view showing a memory map of the RAM 42 shown in FIG. 2. Referring to FIG. 8, the RAM 42 includes a program memory area 70 and a data memory area 72. The program memory area 70 stores therein a game program. The game program may include of a game main processing program 70a, an image generation program 70b, an image display program 70c, a priority setting program 70d, a change operation determination program 70e, a target switching program 70f, and the like.

The game main processing program 70a is a program for processing a main routine of a virtual game of the present exemplary embodiment. The image generation program 70b is a program for generating a game image (game screen) using image data 72b, as will be described later. The image display program 70c is a program for displaying (updating) on a display device (LCD 12 and LCD 14) a game image generated according to the image generation program 70b.

The priority setting program 70d is a program for setting priorities for enemy objects 202 each time a highest priority instruction, as will be described later, is inputted or a predetermined period of time has elapsed, and storing in the data memory area 72 set results (priority data, as will be described later) in association with the enemy objects 202. Note that since in the present embodiment only first to fourth priorities are required, priority data on fifth and lower priority enemy objects 202 does not need to be stored. Note also that in other embodiments the number of priorities required may be changed or priority data on all of enemy objects 202 may be stored.

When priorities are set, first, determination areas such as those shown in FIG. 6 are set according to the current location and traveling direction of the player object 102. Next, it is determined, according to the current location of enemy objects 202, in which area each of the enemy objects 202 are present. Then, according to the numbers of the areas in which the enemy objects 202 are present, priorities of the enemy objects 202 are determined. Note that when there is a plurality of enemy objects 202 within an area of the same number (priority) that the priorities are determined according to the distances from the player object 102. Furthermore, when distances are also the same, priorities are determined according to the shift angle with respect to the traveling direction of the player object 102. For example, in the present exemplary embodiment, a shift from the traveling direction of the player object 102 may be calculated by the sum of the magnitude (absolute value) of an angle θ in the horizontal direction and the magnitude of an angle α in the vertical direction. The magnitudes of angles may be simply added or weights may be assigned such that importance is placed on one of the angles. Alternatively, only one of the angles may be considered according to the type of enemy objects 202.

The change operation determination program 70e is a program for determining whether a player's operation (instruction) is an instruction (sequential switching instruction) to sequentially switch target objects according to priorities or an instruction (highest priority instruction) to switch to a highest priority target object without following the priorities. In the present exemplary embodiment, a period of time (continuous time) during which the player continuously presses the X button 22f is counted and depending on whether the continuous time exceeds a certain period of time, for example, 60 frames it is determined whether the instruction is a sequential switching instruction or a highest priority instruction. In the present exemplary embodiment, when the player continuously presses the X button 22f over a certain period of time the instruction is determined to be a highest priority instruction, and when less than the certain period of time the instruction is determined to be a sequential switching instruction.

The target switching program 70f is a program for switching target objects according to a player's instruction. Note that when the instruction is determined to be a sequential switching instruction according to the change operation determination program 70e, the target switching program 70f switches the selection state to that of a next priority target object. On the other hand, when the instruction is determined to be a highest priority instruction according to the change operation determination program 70e, the target switching program 70f switches the selection state to that of a highest priority target object without following priorities. Note that when, before switching target objects, a highest priority target object is already selected, the selection state is maintained as it is.

Though not shown, the game program also includes a game sound output program and a backup program. The game sound output program is a program for outputting sound necessary for a game, using sound (music) data. The backup program is a program for saving in the memory card 28 (RAM 28b) game data (midway data or result data) stored in the RAM 42, according to an instruction from the player or a game event.

Figure 9:
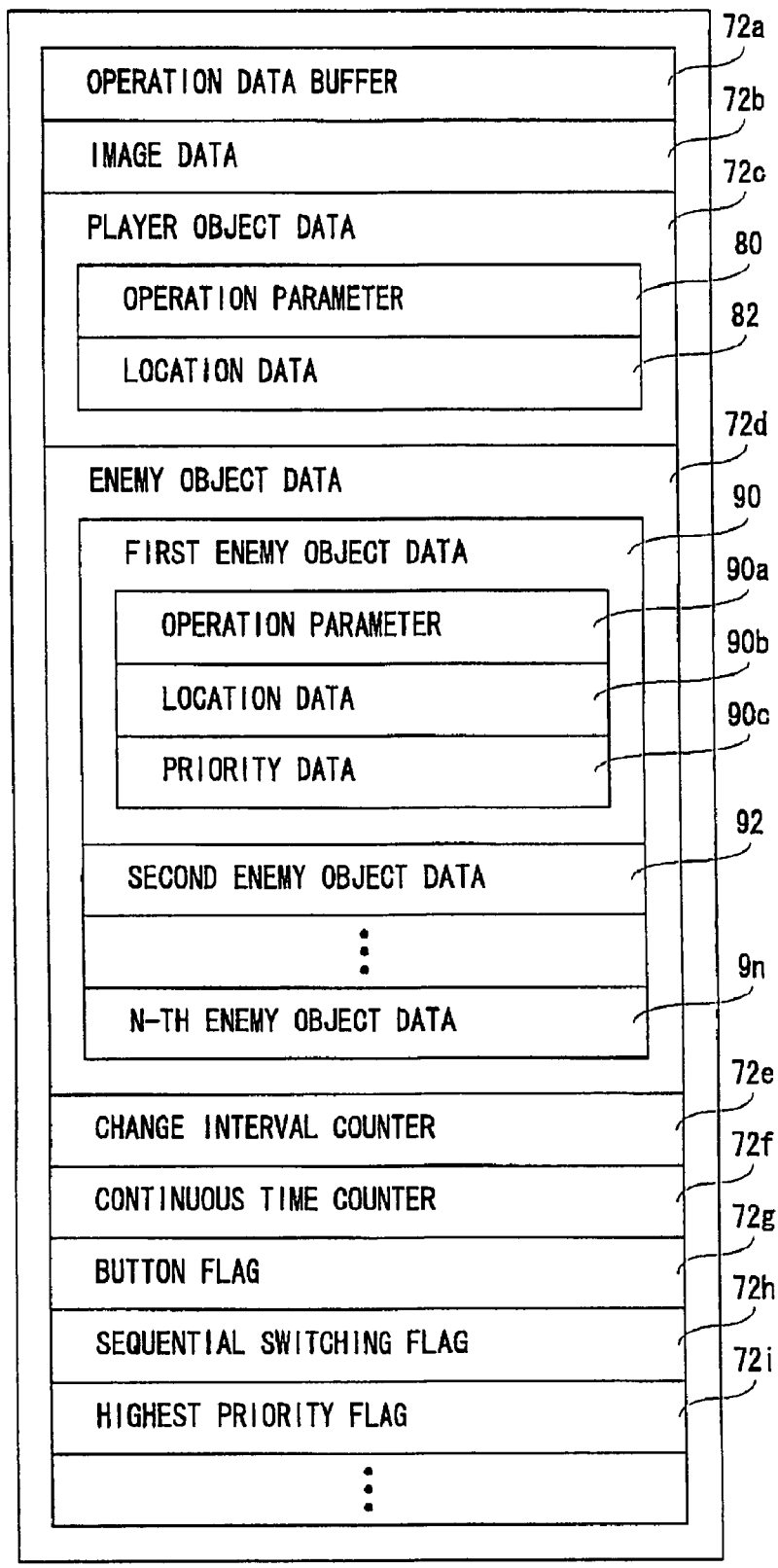
FIG. 9 is an illustrative view showing specific contents of a data memory area shown in FIG. 8.

FIG. 9 is an illustrative view showing specific contents of the data memory area 72 shown in FIG. 8. In the data memory area 72, an operation data buffer 72a is provided. The data memory area 72 stores therein image data 72b, player object data 72c, and enemy object data 72d. Furthermore, in the data memory area 72 are provided a change interval counter 72e, a continuous time counter 72f, a button flag 72g, a sequential switching flag 72h, and a highest priority flag 72i.

The operation data buffer 72a is a buffer for temporarily storing operation data from an operation switch 22 and coordinate data (operation data) from the touch panel 24. The image data 72b is data (data on polygons, texture, and the like) for generating a game image including, for example, a player object 102, enemy objects 202, a background object, and the like.

The player object data 72c is data on a player object 102. The player object data 72c includes an operation parameter 80 of and location data 82 on the player object 102. The operation parameter 80 is data on the traveling direction and movement speed of the player object 102. That is, the operation parameter 80 is data on a vector of movement of the player object 102. The location data 82 is data on the current location of the player object 102 in a three-dimensional game space and is represented by three-dimensional coordinate data. The player object data 72c (the operation parameter 80 and location data 82) is used to arrange (render) the player object 102 in a three-dimensional game space or used when determination areas are determined.

The enemy object data 72d is data on enemy objects 102 and is stored, as can also be seen from FIG. 9, for each enemy object 102. In the present embodiment, first enemy object data 90, second enemy object data 92, n-th enemy object data 9n are stored. The first enemy object data 90 may include an operation parameter 90a, location data 90b, and priority data 90c. The operation parameter 90a is data on a vector (traveling direction and movement speed) of movement of an enemy object 202. The location data 90b is data on the current location of the enemy object 202 in a three-dimensional game space and is represented by three-dimensional coordinate data. The priority data 90c is data (numeric value data) on a number indicating a priority determined according to the priority setting program 70d. Therefore, each time priorities are determined, the priority data 90c is updated. Note that since, as described above, in the present embodiment, only first to fourth priorities are required, priority data is not described for enemy object data (90, 92, . . . 92n) on fifth and lower priority enemy objects 202.

Though a graphical representation and a detailed description are not provided, the same as the first enemy object data 90 also applies to the second enemy object data 92 and to the n-th enemy object data 9n.

The change interval counter 72e is a counter for counting a time interval (change interval) for changing (re-setting) priorities. In the present embodiment, the change interval is set to a certain period of time (e.g., 40 frames) that is shorter than a certain period of time for determining a change operation instruction. The continuous time counter 72f is a counter for counting a continuous time during which the player operates (turns on) a predetermined button. For example, the X button 22f in the exemplary present embodiment.

The button flag 72g is a flag for determining whether the above-described predetermined button, i.e., the X button 22f, is turned on. The button flag 72g is composed of a one-bit register, for example. When the button flag 72g is established (turned on) the data value "1" is set in the register, and when the button flag 72g is not established (is turned off) the data value "0" is set in the register. In the present embodiment, when the X button 22f is turned on the button flag 72g is turned on, and when the X button 22f is turned off the button flag 72g is turned off.

The sequential switching flag 72h is a flag for determining whether target objects are sequentially switched according to priorities. The sequential switching flag 72h is also composed of a one-bit register. When the sequential switching flag 72h is turned on the data value "1" is set in the register, and when the sequential switching flag 72h is turned off the data value "0" is set in the register. In the present embodiment, when the instruction is determined to be a sequential switching instruction the sequential switching flag 72h is turned on, and when the instruction is determined to be a highest priority instruction the sequential switching flag 72h is turned off.

The highest priority flag 72i is a flag for determining whether a target object is switched to a highest priority target object without following priorities. The highest priority flag 72i is also composed of a one-bit register. When the highest priority flag 72i is turned on the data value "1" is set in the register, and when the highest priority flag 72i is turned off the data value "0" is set in the register. In the present embodiment, when the instruction is determined to be a highest priority instruction the highest priority flag 72i is turned on, and when the instruction is determined to be a sequential switching instruction the highest priority flag 72i is turned off.

Though not shown, in the data memory area 72 other data such as sound (music) data is stored and other counters and flags necessary to carry out a game are also provided.

Figure 10:
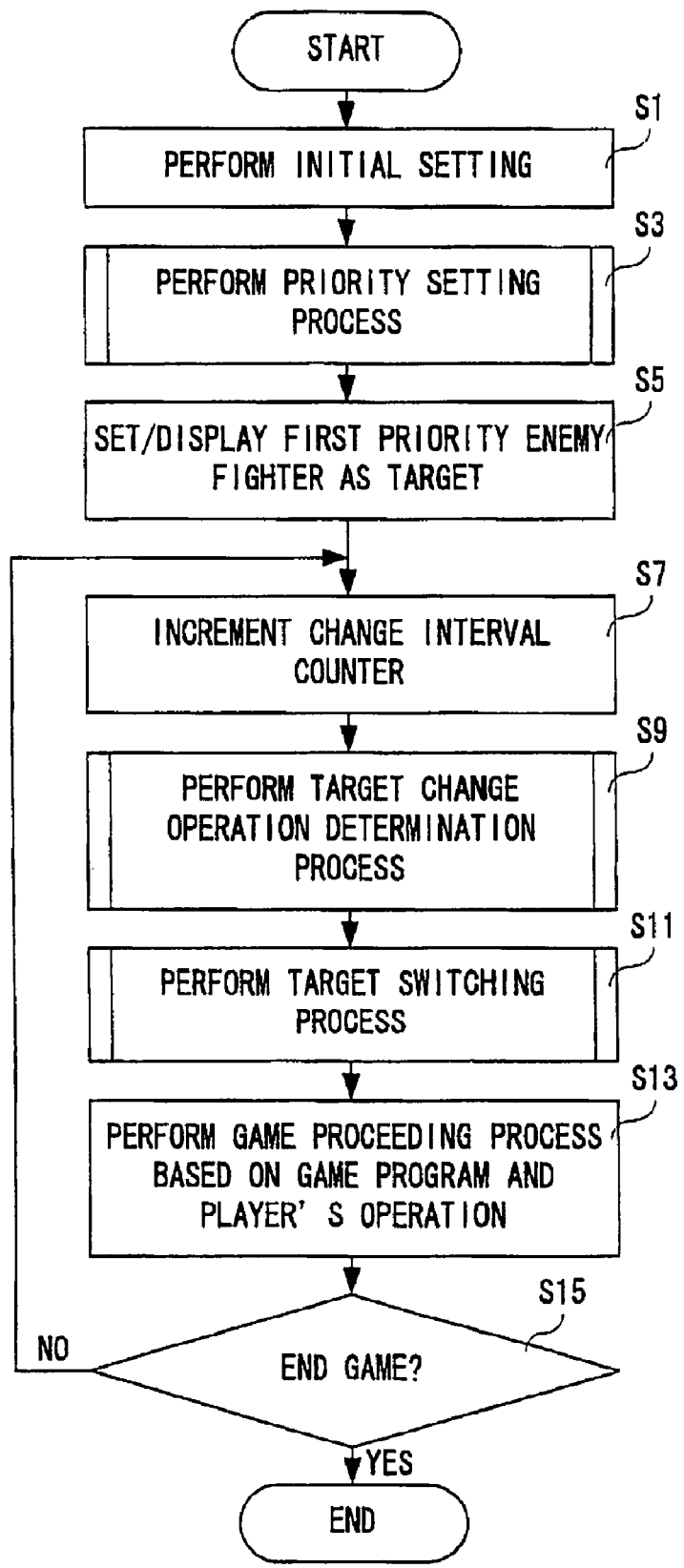
FIG. 10 is a flowchart showing overall game processing of a CPU core shown in FIG. 2.

Specifically, the CPU core 34 shown in FIG. 2 performs overall processing shown in FIG. 10. As shown in FIG. 10, when overall processing is started, in step S1, an initial setting is performed. For example, when a game starts from the beginning, initial values are set for various flags, registers, and counters. In addition, buffer areas (operation data buffer 72a, and the like) in the data memory area 72 are cleared. Note that when a game starts from a previous game, the values of various flags and registers are set according to game data saved in the memory card 28. Note also that in either case in step S1 the count values of the change interval counter 72e and the continuous time counter 72f are set to "0".

In a subsequent step S3, a priority setting process (see FIGS. 11 to 12), as will be described later, is performed. In a next step S5, a first priority enemy fighter (enemy object 202) is set as a target object. At this time, on a game screen 200 displayed on the LCD 14, a graphic object corresponding to the enemy object 202 set as the target object may be pointed to by a cursor or a pointing image.

Subsequently, in a step S7, the change interval counter 72e is incremented. Specifically, one (frame) is added to the count value. In a next step S9, a target change operation determination process (see FIG. 13), as will be described later, is performed and in step S11 a target switching process (see FIGS. 14 and 15), as will be described later, is performed. Then, in step S13, a game proceeding process is performed based on a game program and a player's operation. Here, according to a player's operation, a player object 102 is moved or a missile is launched from the player object 102. In addition, according to the game program, enemy objects 202 are moved or a missile is launched against the player object 102. At this time, a game screen 100 and a game screen 200 are also updated.

Then, in step S15, it is determined whether the game ends. For example, it is determined whether an instruction to end the game is provided by the player or whether a game over occurs. If "NO" in step S15, i.e., if the game does not end, the processing returns to step S7. On the other hand, if "YES" in step S15, i.e., the game ends, then the overall processing ends.

Note that the scan time between steps S7 to S15 may be one frame and thus the change interval counter 72e is incremented every frame.

Figure 11:
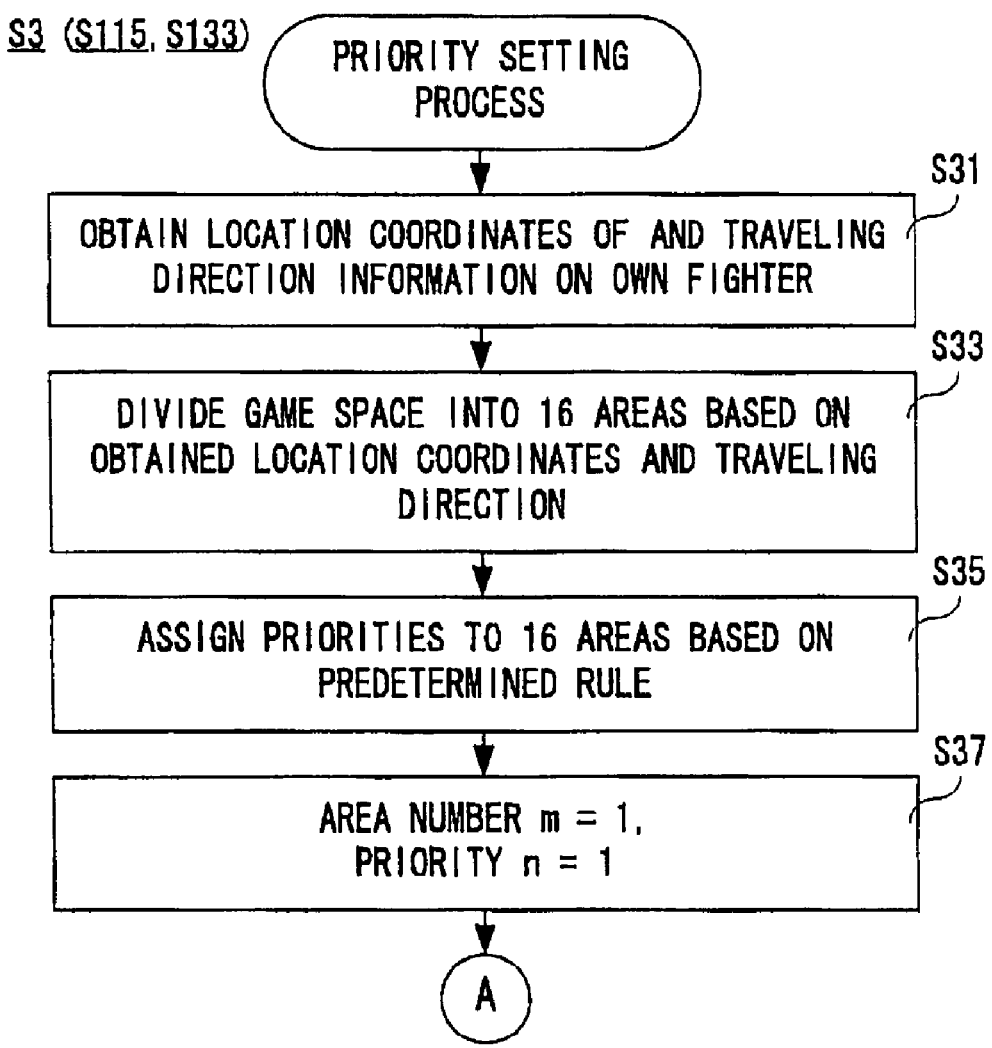
FIG. 11 is a flowchart showing part of a priority setting process of the CPU core shown in FIG. 2.
Figure 12:
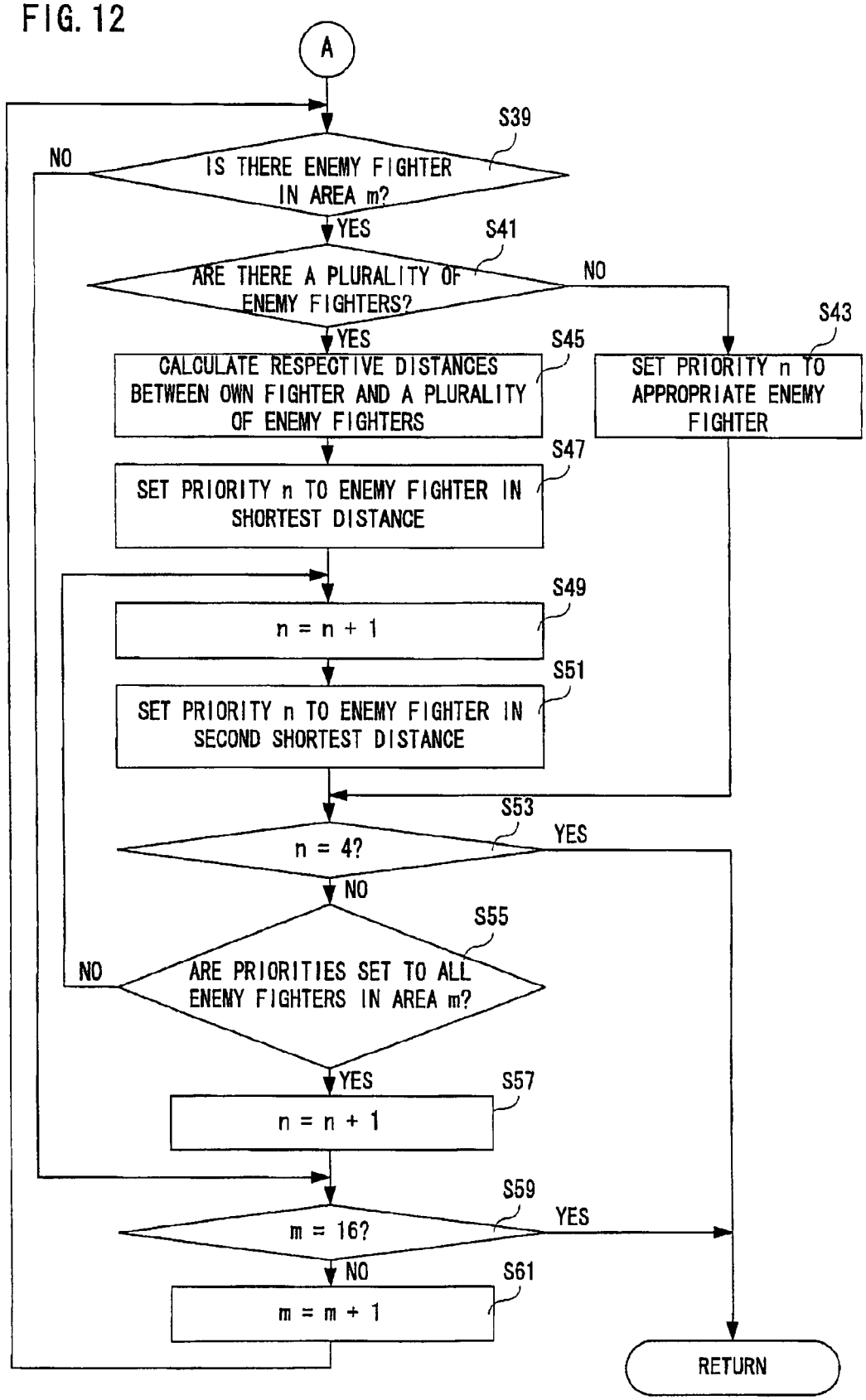
FIG. 12 is a flowchart showing another part of the priority setting process of the CPU core shown in FIG. 2 and being subsequent to the flowchart of FIG. 11.

FIGS. 11 and 12 are flowcharts of the priority setting process in step S3 shown in FIG. 10. As shown in FIG. 11, when the CPU core 34 starts a priority setting process, in step S31, the CPU core 34 obtains location coordinates and traveling direction information on a fighter. Specifically, the CPU core 34 obtains location coordinates of the current location and traveling direction information by referring to the operation parameter 80 and location data 82 that are included in the player object data 72c of the data memory area 72.

In a subsequent step S33, a game space is divided into 16 areas based on the obtained location coordinates and traveling direction information. Namely, determination areas with the player object 102 being the center are set. In a next step S35, priorities are assigned to the 16 areas based on a predetermined rule. In the present exemplary embodiment, as shown in FIGS. 6 and 7(A), area numbers are determined. Specifically, a smaller value (higher priority) is set to the number of an area whose distance from the player object 102 is shorter and whose shift from the traveling direction of the player object 102 is smaller.

Subsequently, in step S37, initial values for a variable m indicating an area number and a variable n indicating a priority are set (m=1 and n=1). As shown in FIG. 12, in a next step S39, it is determined whether there is an enemy fighter in an area m. Here, it is determined whether there is an enemy object 202 including location coordinates (XZ coordinates only) in the area m. If "NO" in step S39, i.e., if there is no enemy fighter in the area m, the processing proceeds to step S59. On the other hand, if "YES" in step S39, i.e., if there is an enemy in the area m, then in step S41 it is determined whether there are a plurality of enemy fighters in the area m.

If "NO" in step S41, i.e., if there is a single enemy fighter in the area m, then in step S43, a priority n is set to the enemy fighter and the processing proceeds to a step S53. On the other hand, if "YES" in step S41, i.e., if there are a plurality of enemy fighters in the area m, then in step S45, respective distances between the fighter and the plurality of enemy fighters are calculated according to equation 1. Then, in step S47, a priority n is set to an enemy fighter in the shortest distance, and in step S49 one is added to the variable n (n=n+1). In a next step S51, a priority n is set to an enemy fighter in the second shortest distance.

Subsequently, in step S53, it is determined whether the variable n is 4. That is, it is determined whether first to fourth priorities are assigned to enemy fighters. If "YES" in step S53, i.e., if the variable n is 4, then it is determined that the setting of a priority n is completed and thus the processing returns to the overall processing shown in FIG. 10.

If "NO" in step S53, i.e., if the variable n is less than 4, then in step S55, it is determined whether a priority n is set to all enemy fighters in the area m. If "NO" in step S55, i.e., if there is an enemy fighter in the area m that is not assigned with a priority n, the processing returns to step S49. On the other hand, if "YES" in step S55, i.e., priorities are set to all enemy fighters in the area m, then in step S57, one is added to the variable n and the processing proceeds to step S59.

In step S59, it is determined whether the variable m is 16. That is, it is determined whether all areas m are checked on whether they have an enemy fighter. If "YES" in step S59, i.e., if the variable m is 16, then it is determined that all areas m are checked on whether they have an enemy fighter and thus the processing returns to the overall processing. On the other hand, if "NO" in step S59, i.e., if the variable m is less than 16, then in a step S61, one is added to the variable m (m=m+1) and the processing returns to the step S39.

Figure 13:
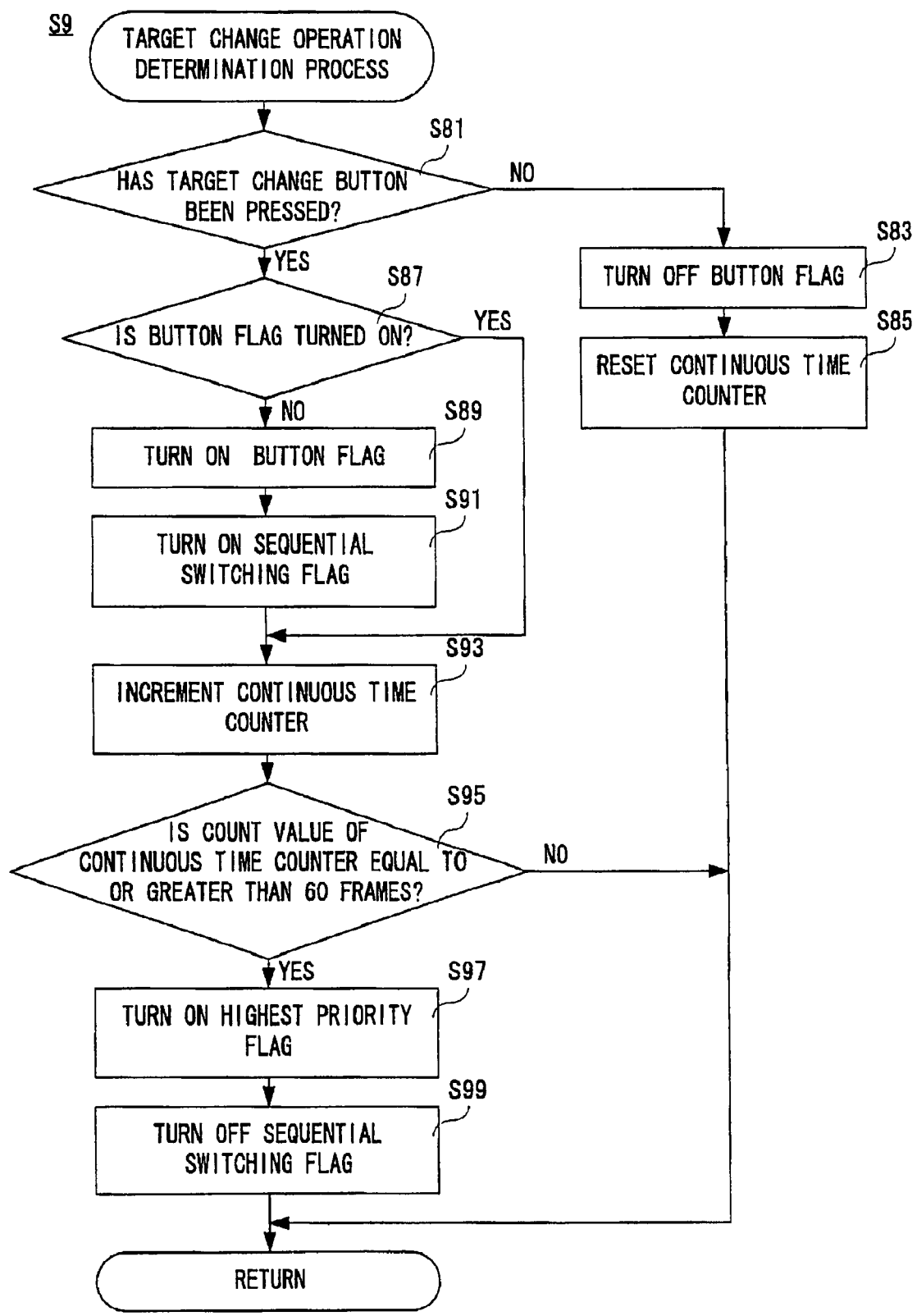
FIG. 13 is a flowchart showing a target change operation determination process of the CPU core shown in FIG. 2.

FIG. 13 is a flowchart of the target change operation determination process in the step S9 shown in FIG. 10. As shown in FIG. 13, when the CPU core 34 starts a target change operation determination process, in a step S81, it is determined whether a target change button has been pressed. In the present embodiment, the CPU core 34 determines by referring to the operation data buffer 72a of the data memory area 72 whether the X button 22f has been operated.

If "NO" in step S81, i.e., if the target change button has not been pressed, then in step S83 the button flag 72g is turned off, and in step S85 the continuous time counter 72f is reset and then the processing returns to the overall processing shown in FIG. 10. On the other hand, if "YES" in step S81, i.e., if the target change button has been pressed, then in step S87 it is determined whether the button flag 72g is turned on. That is, it is determined whether the target change button (X button 220 is continuously pressed.

If "YES" in step S87, i.e., if the button flag 72g is turned on, then it is determined that the target change button is continuously pressed and thus the processing proceeds to step S93. On the other hand, if "NO" in step S87, i.e., if the button flag 72g is turned off, then it is determined that the target change button has been pressed this time and thus in step S89 the button flag 72g is turned on, and in step S91 the sequential switching flag 72h is turned on and then the processing proceeds to step S93.

In step S93, the continuous time counter 72f is incremented. Since, as described above, the scan time between steps S7 to S15 is one frame, when the target change button is continuously pressed addition is performed on the continuous time counter 72f one frame by one frame.

In subsequent step S95, it is determined whether the count value of the continuous time counter 72f is equal to or greater than, for example, 60 frames. That is, it is determined whether the target change button is continuously pressed over a certain period of time. If "NO" in step S95, i.e., if the count value of the continuous time counter 72f is less than 60 frames, the processing returns to the overall processing. On the other hand, if "YES" in step S95, i.e., if the count value of the continuous time counter 72f is equal to or greater than 60 frames, then in step S97 the highest priority flag 72i is turned on, and in step S99 the sequential switching flag 72h is turned off and the processing returns to the overall processing.

Figure 14:
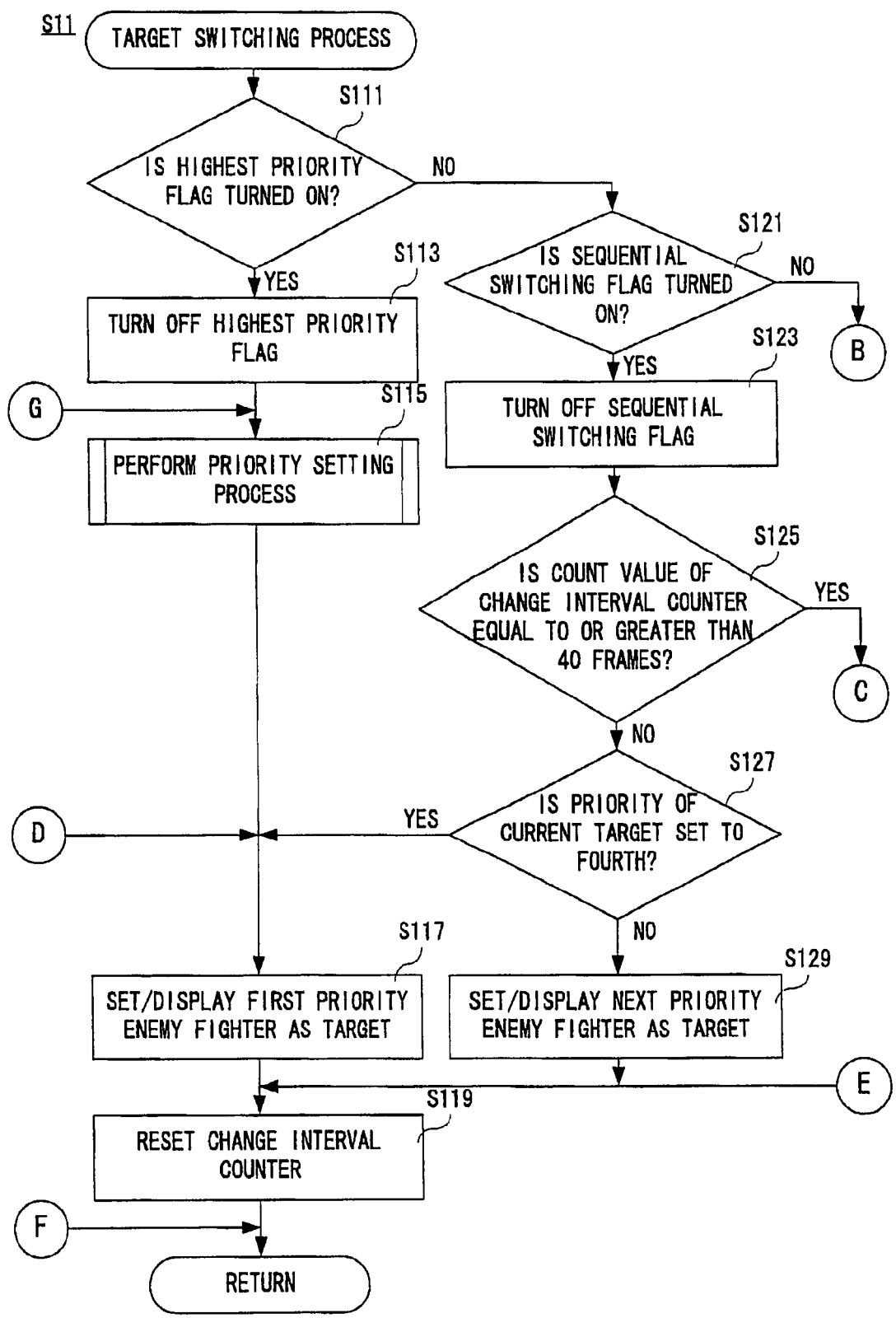
FIG. 14 is a flowchart showing part of a target switching process of the CPU core shown in FIG. 2.
Figure 15:
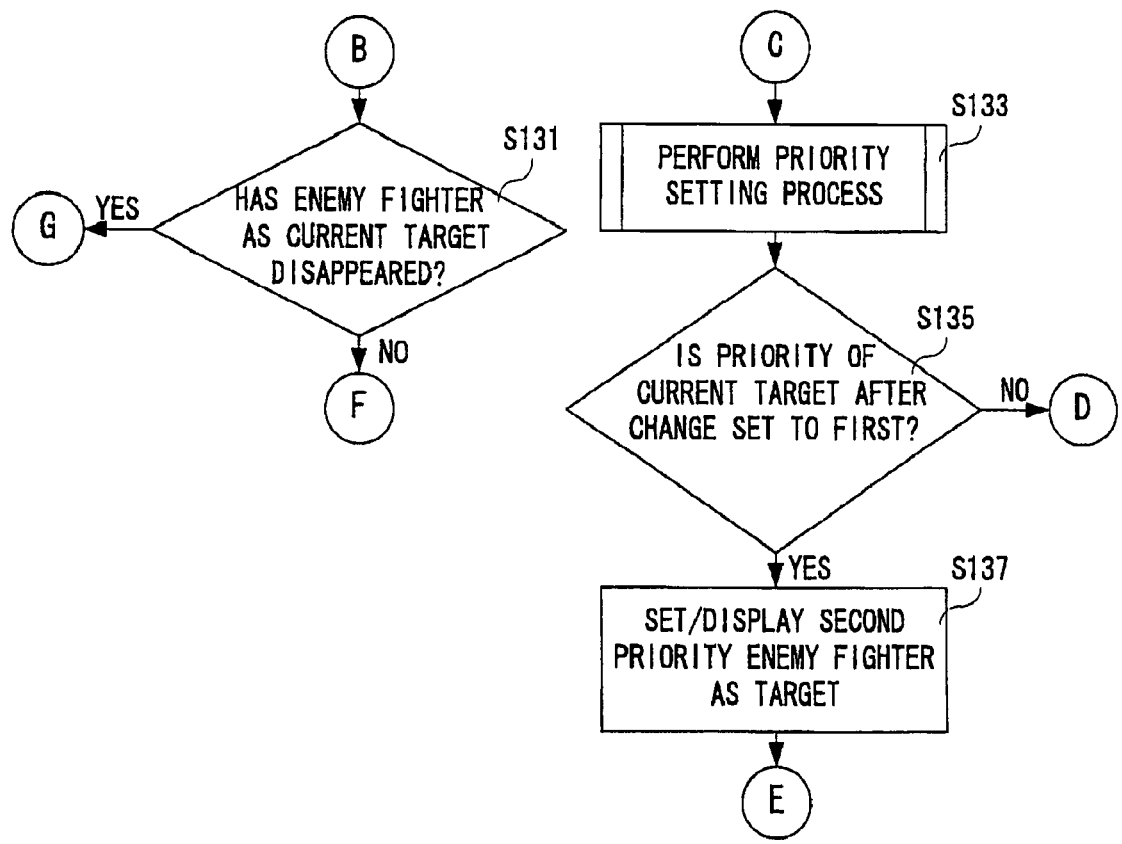
FIG. 15 is a flowchart showing another part of the target switching process of the CPU core shown in FIG. 2 and being subsequent to the flowchart of FIG. 14.

FIGS. 14 and 15 are flowcharts of the target switching process in step S11 shown in FIG. 10. As shown in FIG. 14, when the CPU core 34 starts a target switching process, in step S111, it is determined whether the highest priority flag 72i is turned on. If "YES" in step S111, i.e., if the highest priority flag 72i is turned on, then it is determined that the instruction is a highest priority switching instruction. Thus, in step S113 the highest priority flag 72i is turned off, in step S115 the above-described priority setting process is performed, in step S117 a first priority enemy fighter is set as a target object, and in step S119 the change interval counter 72e is reset and the processing returns to the overall processing shown in FIG. 10.

Note that the process in step S117 is the same as that in step S5 shown in FIG. 10 and thus an overlapping description thereof is not provided.

On the other hand, if "NO" in step S111, i.e., if the highest priority flag 72i is turned off, then it is determined in step S121 whether the sequential switching flag 72h is turned on. If "NO" in step S121, i.e., if the sequential switching flag 72h is turned off, then it is determined that a target change operation is not performed, and thus, it is determined in step S131, shown in FIG. 15, whether an enemy fighter as the current target has disappeared. Specifically, for example, it is determined whether a target object has disappeared from a three-dimensional game space by an attack by the player object 102 or movement of the target object.

If "NO" in step S131, i.e., if the enemy fighter as the current target has not disappeared, the processing returns to the overall processing shown in FIG. 10. On the other hand, if "YES" in step S131, i.e., if the enemy fighter as the current target has disappeared, the processing proceeds to step S115 shown in FIG. 14. Specifically, priorities are set and a first priority enemy object 202 is set as a target object.

Referring back to FIG. 14, if "YES" in step S121, i.e., if the sequential switching flag 72*h* is turned on, then it is determined that the instruction is a sequential switching instruction. Thus, in step S123 the sequential switching flag 72*h* is turned off, and then, in step S125 it is determined whether the count value of the change interval counter 72*e* is equal to or greater than 40 frames. If "NO" in step S125, i.e., if the count value of the change interval counter 72*e* is less than 40 frames, then in step S127 it is determined whether the priority of the current target is fourth. Here, the CPU core 34 determines by referring to enemy object data (90, 92, ... 9*n*) on an enemy object 202 as the current target whether the priority of the enemy object 202 is fourth.

If "YES" in step S127, i.e., if the priority of the current target is fourth, then in order to select a first priority enemy object 202 as a target object, the processing proceeds to step S117. On the other hand, if "NO" in step S127, i.e., the priority of the current target is not fourth, then in step S129 a next priority enemy object 202 is selected as a target object and the processing proceeds to step S119.

If "YES" in step S125, i.e., if the count value of the change interval counter 72*e* is equal to or greater than 40 frames, then it is determined that priorities are to be re-set, and thus, in step S133, shown in FIG. 15, the above-described priority setting process is performed. Then, in step S135, it is determined whether the priority of the current target after change is first. If "NO" in step S135, i.e., if the priority of the current target after change is not first, the processing proceeds to step S117 shown in FIG. 14. On the other hand, if "YES" in step S135, i.e., if the priority of the current target after change is first, then in step S137 a second priority enemy object 202 is set as a target object and the processing proceeds to step S119 shown in FIG. 14. As such, when the player provides a sequential switching instruction, the target is always switched to another enemy object 202. By this, occurrence of an inconvenience can be prevented that the target is not switched to another despite the fact a sequential switching instruction is provided; accordingly, it is possible to prevent the player from suffering from stress that an operation is not reflected in a game.

According to the present exemplary embodiment, each time the target change button is pressed, the selection state of an enemy object as a target is sequentially changed according to priorities and when the target change button is continuously pressed over a certain period of time, without following the priorities, a first priority enemy object is selected as a target. Thus, an already selected enemy object or the first enemy object can be reselected by a simple operation. Hence, game operability may not be deteriorated.

Note that although, in the present exemplary embodiment, a sequential switching instruction or a highest priority switching instruction is inputted using one operation button, it is also possible to use different operation buttons. For example, each time the X button 22*f* is pressed the selection of a target object may be sequentially switched, and when the Y button 22*g* is continuously pressed over a certain period of time a first priority enemy object may be selected as a target object. Pressing a button over a certain period of time in this manner is to prevent a first priority enemy object from being selected as a target object by simple miss-pressing of the buttons. Hence, for example, instead of an operation of continuously pressing one button over a certain period of time, when a plurality of buttons are continuously operated, a first priority enemy object may be selected as a target object.

Alternatively, sequential switching or highest priority switching of targets may be performed by, instead of using an operation button, allowing a "target switch button" to be displayed on a game screen 200 and determining, based on a detection signal from the touch panel 24, whether the "target switching button" is continuously touched by a touch pen or the like over a certain period of time.

Although, in the present exemplary embodiment, a touch panel is used as a pointing device, it is also possible to use other pointing devices such as a pen tablet, a touchpad, and a computer mouse. It is, of course, possible to use conventional operation switches. Note, however, that when other pointing devices or operation switches are used, there is a need to display a pointing image, such as a mouse pointer, for indicating a pointed location on a screen.

The configuration of the game apparatus should not be limited to the configuration in the above-described embodiment. For example, a single LCD may be provided or a touch panel may be provided to each of the two LCDs.

A game apparatus 10 of another embodiment is the same as that of the above-described embodiment except that each time a sequential switching instruction is provided the selection state of a target object is switched according to the latest priorities, and thus, an overlapping description thereof is not provided. Therefore, in the above-described embodiment, the change interval counter 72*e* is not required.

Figure 16:
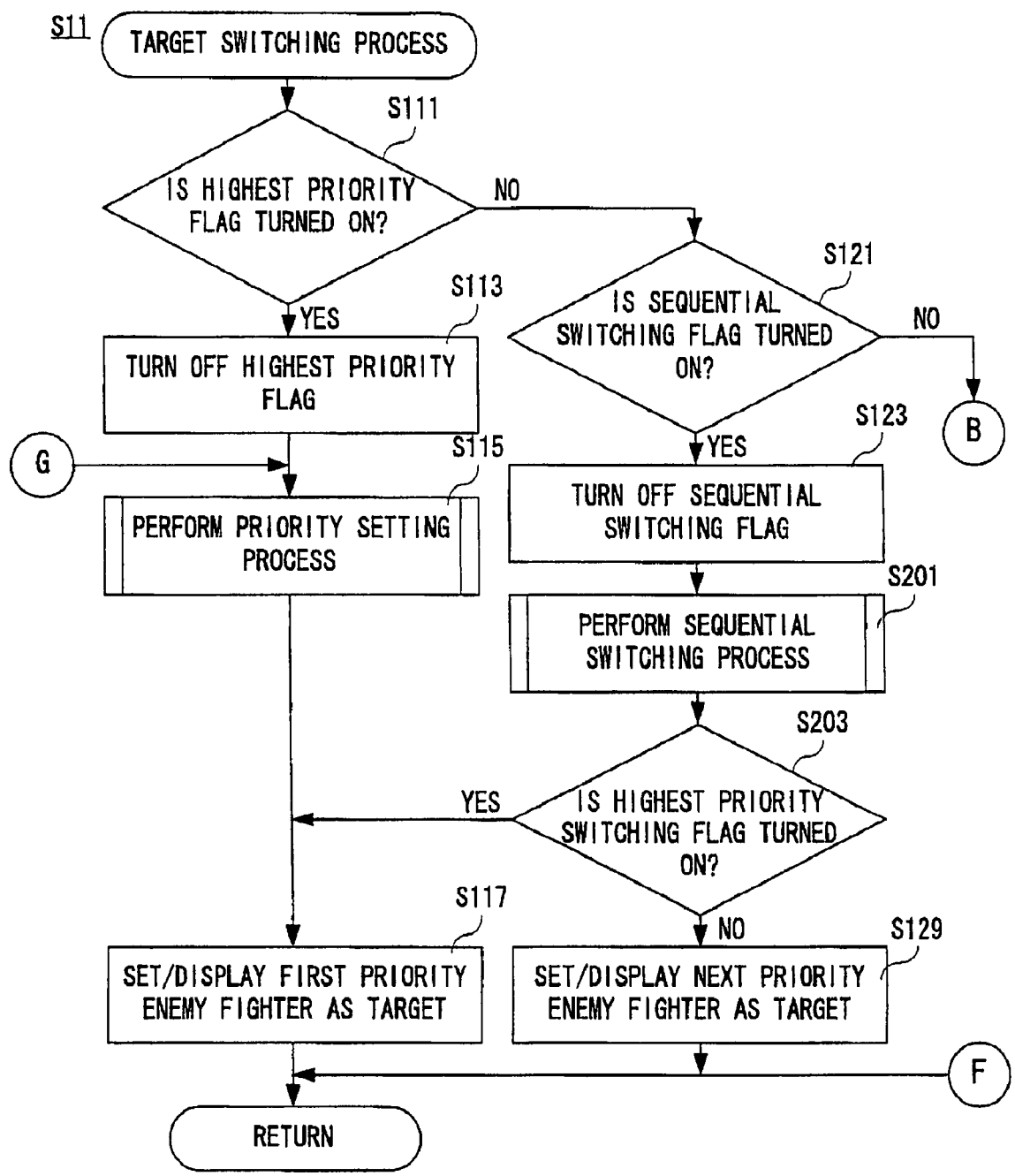
FIG. 16 is a flowchart showing part of a target switching process of the CPU core in another embodiment.
Figure 17:
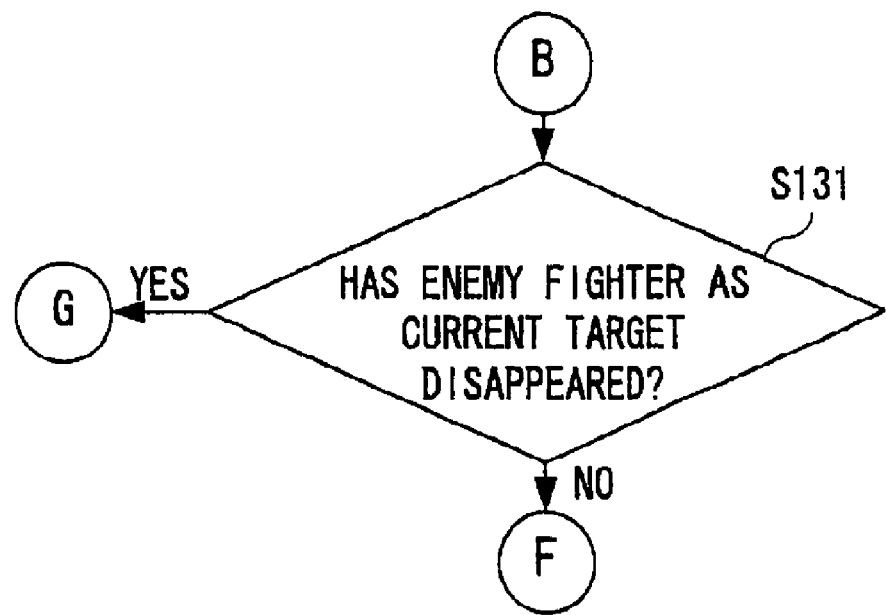
FIG. 17 is a flowchart showing another part of the target switching process of the CPU core in another embodiment and being subsequent to the flowchart of FIG. 16.

Specifically, a target switching process in another exemplary embodiment is shown in flowcharts of FIGS. 16 and 17. The target switching process in another embodiment is such that the target switching process in the above-described embodiment is partially changed, and thus, the same steps are denoted by the same reference numerals. Also, an overlapping description of the same processes is not provided.

As shown in FIG. 16, in the target switching process in another embodiment, when the sequential switching flag 72*h* is turned on it is "YES" in step S121, and when the sequential switching flag 72*h* is turned off in step S123 a sequential switching process (FIGS. 18 to 20), as will be described later, is performed. Then, as a result of the sequential switching process, in step S203 it is determined whether the highest priority switching flag is turned on. Here, the highest priority switching flag is a flag for determining whether to set a first priority enemy object 202 as a target object. The highest priority switching flag is also composed of a one-bit register and included in the data memory area 72. When the highest priority switching flag is turned on the data value "1" is set in the register, and when the highest priority switching flag is turned off the data value "0" is set in the register. When the highest priority switching flag is turned on, it is "YES" in step S203 and thus the process proceeds to step S117. On the other hand, when the highest priority switching flag is turned off, in order to set a next priority enemy object 202 as a target object, the processing proceeds to step S129.

Figure 18:
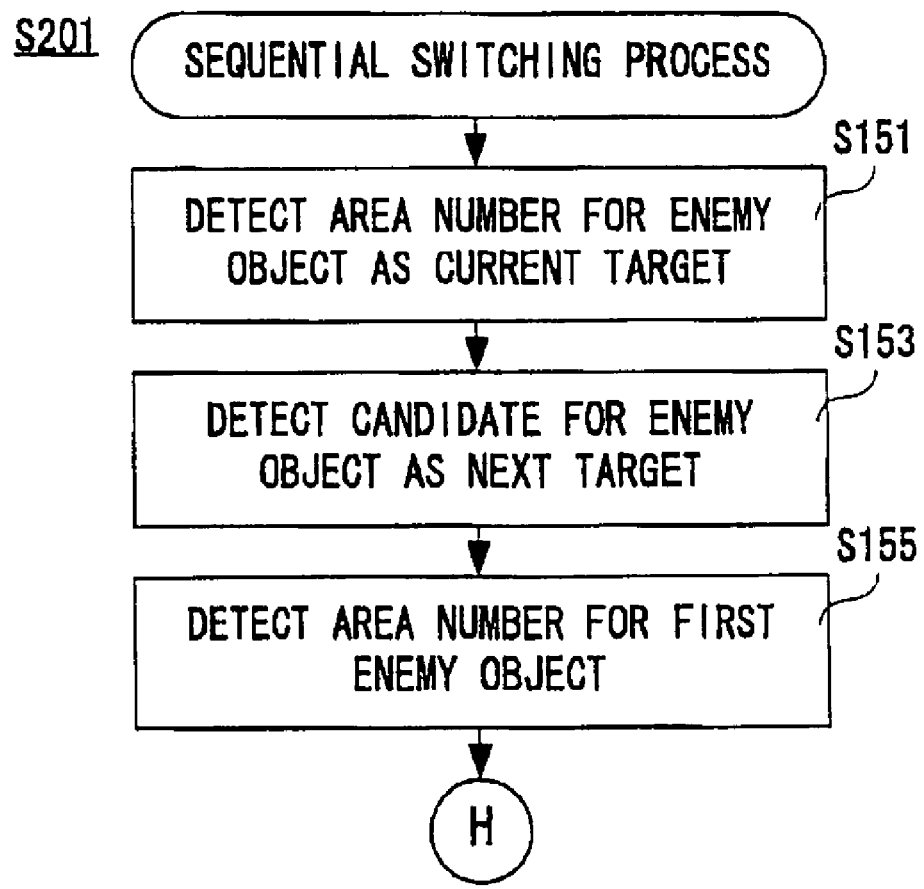
FIG. 18 is a flowchart showing part of a sequential switching process of the CPU core in another embodiment.

As shown in FIG. 18, when the CPU core 34 starts a sequential switching process, in step S151, an area number for an enemy object 202 as the current target is detected. In subsequent step S153, a candidate for an enemy object 202 as the next target is detected. Specifically, an enemy object 202 present in an area indicated by an area number subsequent to the area number detected in step S151 is detected. Note that if there is no enemy object 202 in an area indicated by an area number subsequent to the area number for the enemy object 202 as the current target, an enemy object 202 present in an area indicated by a further subsequent area number is detected. The same process is repeated until a candidate for an enemy object 202 as the next target is detected.

Subsequently, in step S155, an area number for the first enemy object 202 is detected. Note that the order of enemy objects 202 here is to determine a candidate for the next target by searching all enemy objects 202 and thus is arbitrarily set or set according to the order stored in the data memory area 72. Note that a search is performed on all of enemy objects 202 except for an enemy object 202 as the current target and a candidate for the next target. An enemy object 202 to be searched is hereinafter referred to as "the enemy object 202".

Figure 19:
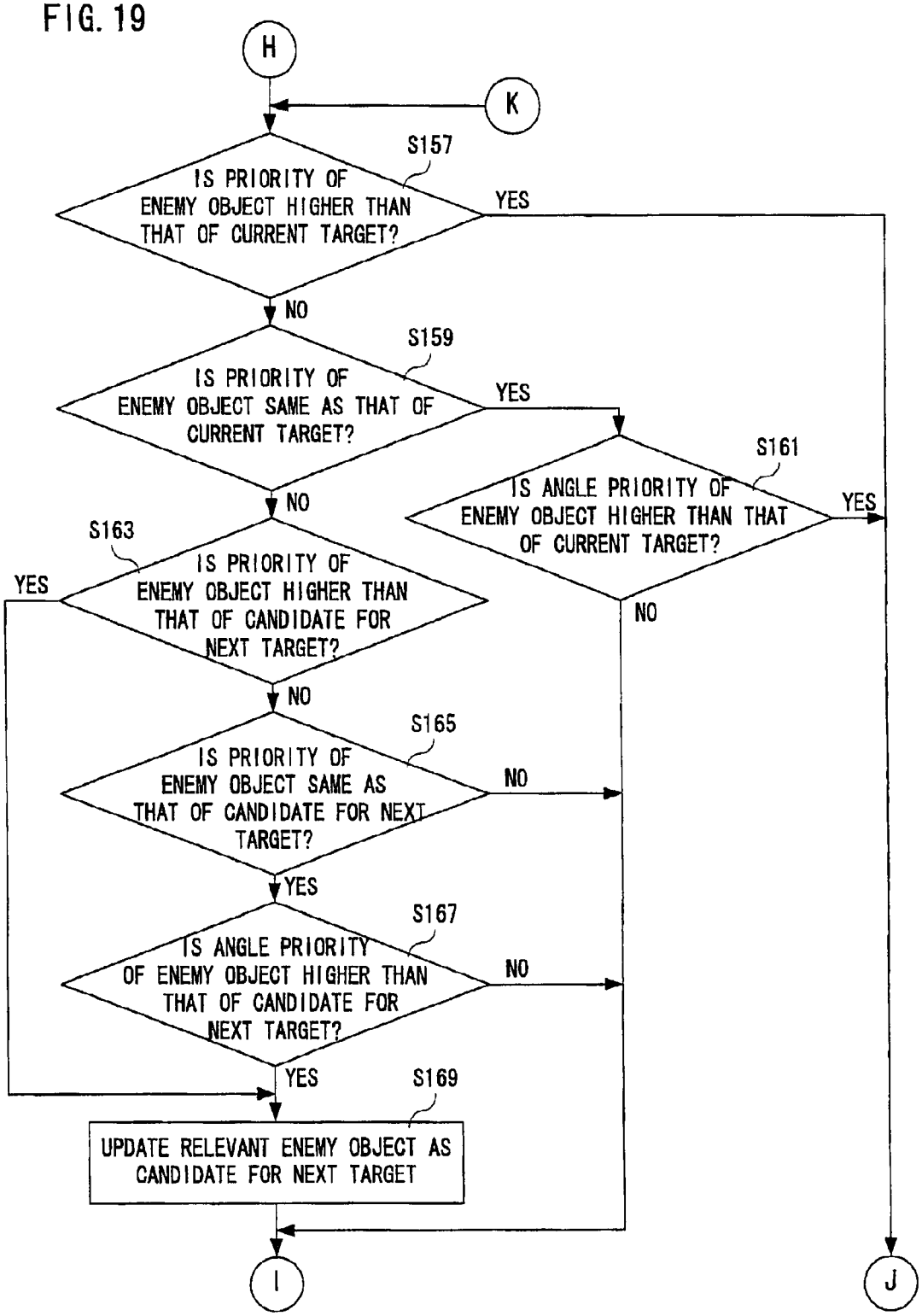
FIG. 19 is a flowchart showing another part of the sequential switching process of the CPU core in another embodiment and being subsequent to the flowchart of FIG. 18.

As shown in FIG. 19, in a next step S157, it is determined whether the priority of the enemy object 202 is higher than that of the current target. Specifically, it is determined whether an area number for the enemy object 202 is smaller than that of the enemy object 202 as the current target. Note that when the area number for the enemy object 202 is the same as that for the enemy object 202 as the current target, it is determined whether a distance (referred to as the "first distance" for convenience of description) between the player object 102 and the enemy object 202 is shorter than a distance (referred to as the "second distance" for convenience of description) between the player object 102 and the enemy object 202 as the current target. Note that this distance determination may not be performed.

Figure 20:
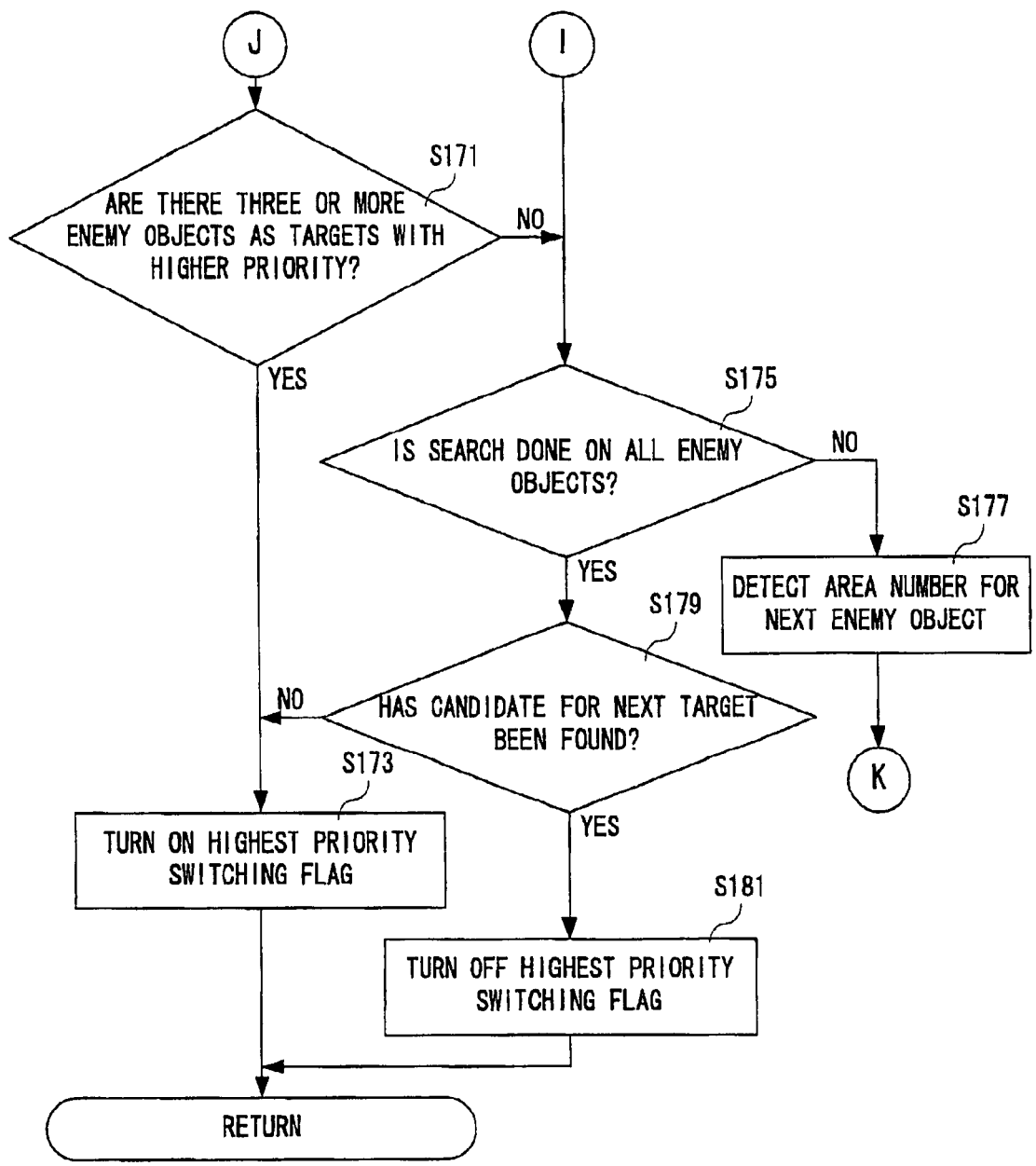
FIG. 20 is a flowchart showing still another part of the sequential switching process of the CPU core in another embodiment and being subsequent to the flowchart of FIG. 19.

If "YES" in step S157, i.e., if the priority of the enemy object 202 is higher than that of the current target, the processing proceeds to step S171 shown in FIG. 20. On the other hand, if "NO" in step S157, i.e., if the priority of the enemy object 202 is not higher than that of the current target, then in step S159 it is determined whether the priority of the enemy object 202 is the same as that of the current target. Here, it is determined whether the first distance matches the second distance.

If "YES" in step S159, i.e., if the priority of the enemy object 202 is the same as that of the current target, then in step S161 it is determined whether the angle priority of the enemy object 202 is higher than that of the current target. Specifically, it is determined whether a shift (θ+α in the present exemplary embodiment) from the traveling direction of the player object 102 is smaller. If "YES" in step S161, i.e., the angle priority of the enemy object 202 is higher than that of the current target, the processing proceeds to step S171. On the other hand, if "NO" in step S161, i.e., if the angle priority of the enemy object 202 is lower than that of the current target, the processing proceeds to step S175 shown in FIG. 20.

On the other hand, if "NO" in step S159, i.e., if the priority of the enemy object 202 is not the same as that of the current target, then it is determined that the priority of the enemy object 202 is lower than that of the current target, and thus, in step S163 it is determined whether the priority of the enemy object 202 is higher than that of a candidate for the next target. This determination method is the same as that described in step S157 and thus an overlapping description thereof is not provided.

If "YES" in step S163, i.e., if the priority of the enemy object 202 is higher than that of the candidate for the next target, the processing proceeds to step S169. On the other hand, if "NO" in step S163, i.e., if the priority of the enemy object 202 is not higher than that of the candidate for the next target, then in step S165 it is determined whether the priority of the enemy object 202 is the same as that of the candidate for the next target.

If "NO" in step S165, i.e., if the priority of the enemy object 202 is not the same as that of the candidate for the next target, then it is determined that the priority of the enemy object 202 is lower than that of the candidate for the next target and thus the processing proceeds to step S175. On the other hand, if "YES" in step S165, i.e., if the priority of the enemy object 202 is the same as that of the candidate for the next target, then in step S167 it is determined whether the angle priority of the enemy object 202 is higher than that of the candidate for the next target. If "NO" in step S167, i.e., if the angle priority of the enemy object 202 is not higher than that of the candidate for the next target, the processing proceeds to step S175. On the other hand, if "YES" in step S167, i.e., if the angle priority of the enemy object 202 is higher than that of the candidate for the next target, then in step S169 the enemy object 202 is updated as a candidate for the next target and the processing proceeds to step S175.

As shown in FIG. 20, in step S171, it is determined whether there are three or more enemy objects 202 with a higher priority than the priority of the current target. If "NO" in step S171, i.e., if there are less than three enemy objects 202 with a higher priority than the priority of the current target, the processing proceeds to step S175. On the other hand, if "YES" in step S171, i.e., if there are three or more enemy objects 202 with a higher priority than the priority of the current target, then it is determined that the priority of the current target is fourth or lower, and thus, in a step S173 the highest priority switching flag is turned on and the processing returns to the target switching process.

In step S175, it is determined whether a search is done on all enemy objects 202. If "NO" in step S175, i.e., if a search is not done on all enemy objects 202, an area number for the next enemy object 202 is detected in step S177 and the processing returns to step S157 shown in FIG. 19. On the other hand, if "YES" in step S175, i.e., if a search is done on all enemy objects 202, it is determined whether a candidate for the next target has been found in step S179. That is, it is determined whether there is an enemy object 202 that should be selected next.

If "NO" in step S179, i.e., if the candidate for the next target has not been found, the processing proceeds to step S173. On the other hand, if "YES" in step S179, i.e., if the candidate for the next target has been found, then in step S181 the highest priority switching flag is turned off and the processing returns to the target switching process.

Even in this manner, the selection state of a target object can be sequentially switched. By doing so, switching and selection of a target object can be performed based on the latest information updated each time a switching instruction from the player is provided.

In another exemplary embodiment too, as with the above-described embodiment, by improving operability, a decrease in interest in the game can be prevented.

Note that although in the described exemplary embodiments the determination areas are set with reference to the current location and traveling direction of a player object; and priorities of enemy objects are set, other exemplary embodiments may not be limited thereto. The location and traveling direction, in T (>0) seconds, of a player object may be predicted to set determination areas according to prediction results, and similarly, the locations and traveling directions, in T seconds, of enemy objects may be predicted to set priorities. The location and traveling direction, in T seconds, of a player object can be easily determined by physical calculation using an operation parameter of the player object. Since the movement of enemy objects is controlled according to a game program, the locations and traveling directions, in T seconds, of the enemy objects can be easily predicted (found).

Although, in the exemplary embodiments, determination areas are set and then priorities of enemy objects are set, the exemplary embodiments do not need to be limited thereto. Without setting determination areas, as in the above-described embodiments, by calculating, with reference to the location and traveling direction of a player object, a distance between the player object and each enemy object and a shift from the traveling direction, priorities of the enemy objects may be set according to results of the calculation.

Although, in the above-described exemplary embodiments, an example of a three-dimensional game is described, certain exemplary embodiments may, for example, be applied to two-dimensional games.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium storing a game program for a game apparatus that displays on a screen a virtual game space in which a plurality of non-player objects serving as targets are arranged, said game program causing a computer of said game apparatus to perform:
   sequentially switching said plurality of non-player objects and selecting one non-player object therefrom each time a predetermined input is made from an input operation controller;
   setting priorities for selection to be made for said plurality of non-player objects;
   detecting a continuous time during which a state where said predetermined input is being made continues;
   sequentially switching said plurality of non-player objects and selecting a non-player object, according to the set priorities, when said continuous time is less than a predetermined value; and
   switching to a non-player object with a highest one of said priorities and selecting said non-player object, when said continuous time is equal to or greater than the predetermined value.

2. The non-transitory computer readable storage medium storing the game program according to claim 1, wherein
   when said continuous time is equal to or greater than the predetermined value, priorities for selection to be made are re-set for said plurality of non-player objects, and
   a non-player object with a highest one of said re-set priorities is selected.

3. The non-transitory computer readable storage medium storing the game program according to claim 1, wherein said game program further causes said computer to perform:
   detecting an elapsed time from when switching and selection are performed, wherein
   when said elapsed time is equal to or greater than a predetermined value, priorities for selection to be made are re-set for said plurality of non-player objects, and
   each time said predetermined input is made, said plurality of non-player objects are sequentially switched and a non-player object is selected, according to the re-set priorities.

4. The non-transitory computer readable storage medium storing the game program according to claim 1, wherein said game program further causes said computer to perform:
   obtaining location information on and a traveling direction of a player object in said virtual game space;
   dividing said virtual game space into a plurality of areas based on said location information, traveling direction, left and right angles, and a distance with said location information being a base point; and
   setting selection priorities for the areas divided in said area division, wherein
   higher priorities are sequentially set to said non-player objects in order, from one present in an area with a highest one of the set priorities to one in a lowest priority area.

5. The non-transitory computer readable storage medium storing the game program according to claim 4, wherein said game program further causes said computer to perform:
   predicting location information and a traveling direction where said player object reaches in time T (T>0), and
   said virtual game space is divided into a plurality of areas based on said predicted location information and said predicted traveling direction and left and right angles and a distance with said location information being a base point.

6. A game apparatus that displays on a screen a virtual game space in which a plurality of non-player objects serving as targets are arranged, said game apparatus comprising:
   a selection programmed logic circuitry for sequentially switching said plurality of non-player objects and selecting one non-player object therefrom each time a predetermined input is made from an input operation controller;
   a non-player object selection priority setting programmed logic circuitry for setting priorities for selection to be made by said selection programmed logic circuitry, for said plurality of non-player objects; and
   an input state continuous time detection programmed logic circuitry for detecting a continuous time during which a state where said predetermined input is being made continues, wherein
   said selection programmed logic circuitry includes:
      a first selection programmed logic circuitry for sequentially switching said plurality of non-player objects and selecting a non-player object, according to the priorities set by said non-player object selection priority setting programmed logic circuitry, when said continuous time is less than a predetermined value; and
      a second selection programmed logic circuitry for switching to a non-player object with a highest one of said priorities and selecting said non-player object, when said continuous time is equal to or greater than the predetermined value.

7. A game control method for a game apparatus that displays on a screen a virtual game space in which a plurality of non-player objects serving as targets are arranged, said game apparatus having one or more processors and said game control method comprising:
   sequentially switching said plurality of non-player objects and selecting one non-player object therefrom each time a predetermined input is made from an input operation controller;
   setting priorities for selection to be made for said plurality of non-player objects via the one or more processors;
   detecting a continuous time during which a state where said predetermined input is being made continues;

sequentially switching said plurality of non-player objects and selecting a non-player object, according to the set priorities when said continuous time is less than a predetermined value; and switching to a non-player object with a highest one of said priorities and selecting said non-player object, when said continuous time is equal to or greater than the predetermined value.

8. A game system, comprising:

a display screen for displaying a virtual game space in which a plurality of non-player objects serving as targets are arranged; and a game apparatus that displays on the display screen the virtual game space in which the plurality of non-player objects serving as targets are arranged, the game apparatus having:

a selection device for sequentially switching said plurality of non-player objects and selecting one non-player object therefrom each time a predetermined input is made from an input operation controller, a non-player object selection priority setting device for setting priorities for selection to be made by said selection device, for said plurality of non-player objects, and an input state continuous time detection device for detecting a continuous time during which a state where said predetermined input is being made continues, wherein said selection device having:

a first selection device for sequentially switching said plurality of non-player objects and selecting a non-player object, according to the priorities set by said non-player object selection priority setting device, when said continuous time is less than a predetermined value, and a second selection device for switching to a non-player object with a highest one of said priorities and selecting said non-player object, when said continuous time is equal to or greater than the predetermined value.

\* \* \* \* \*